US012221231B2

United States Patent
Jarecki et al.

(10) Patent No.: US 12,221,231 B2
(45) Date of Patent: Feb. 11, 2025

(54) AUTOMATED METHOD AND SYSTEM FOR AIRCRAFT INSPECTION WITH DATA VALIDATION

(71) Applicant: The Boeing Company, Chicago, IL (US)

(72) Inventors: Walter J. Jarecki, Chino Hills, CA (US); James J. Troy, Issaquah, WA (US); Gregory James Sweers, Renton, WA (US); Charles T. Coccia, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 117 days.

(21) Appl. No.: 17/649,898

(22) Filed: Feb. 3, 2022

(65) Prior Publication Data

US 2023/0242279 A1    Aug. 3, 2023

(51) Int. Cl.
*B64F 5/60* (2017.01)
*B64C 39/02* (2023.01)
(Continued)

(52) U.S. Cl.
CPC .............. *B64F 5/60* (2017.01); *B64C 39/024* (2013.01); *G05D 1/0094* (2013.01);
(Continued)

(58) Field of Classification Search
CPC ....... B64F 5/60; B64C 39/024; G05D 1/0094; G05D 1/104; G06T 7/0002; B64U 2101/30; B64U 2101/26
See application file for complete search history.

(56) References Cited

U.S. PATENT DOCUMENTS 7,643,893 B2   1/2010  Troy et al.
2016/0378895 A1 * 12/2016  Gnecco ................ H04N 23/00
                                                701/2
(Continued)

FOREIGN PATENT DOCUMENTS

WO    WO-2019012298 A1 *  1/2019  ........... B64C 39/024

OTHER PUBLICATIONS

Diego Benjumea, Localization System for Lightweight Unmanned Aerial Vehicles in Inspection Tasks (Year: 2021).*
(Continued)

*Primary Examiner* — Kenneth J Malkowski
*Assistant Examiner* — Moises Gasca Alva
(74) *Attorney, Agent, or Firm* — Yee & Associates, P.C.

(57) ABSTRACT

A method, apparatus, system, and computer program product for inspecting an aircraft. A computer system receives captured data associated with a flight path flown by an unmanned aircraft system to acquire the captured data for the aircraft. The computer system compares the captured data with reference data for the aircraft to form a comparison. The computer system determines whether the captured data is within a set of tolerances for valid captured data using a result of the comparison. Prior to detecting anomalies for the aircraft using the captured data, the computer system determines a set of corrective actions in response to the captured data being outside of the set of tolerances for the valid captured data in which the set of corrective actions is performed.

25 Claims, 15 Drawing Sheets

(51) Int. Cl.
*B64U 101/30* (2023.01)
*G05D 1/00* (2024.01)
*G06T 7/00* (2017.01)

(52) U.S. Cl.
CPC ........ *G06T 7/0002* (2013.01); *B64U 2101/30* (2023.01); *G05D 1/104* (2013.01)

(56) References Cited

U.S. PATENT DOCUMENTS

| | | | |
|---|---|---|---|
| 2017/0285631 A1 | 10/2017 | Bethke et al. | |
| 2017/0297745 A1* | 10/2017 | Engel | G01M 5/0016 |
| 2018/0120196 A1 | 5/2018 | Georgeson et al. | |
| 2018/0204469 A1* | 7/2018 | Moster | G08G 5/0069 |
| 2018/0299387 A1* | 10/2018 | Nonaka | G01M 5/0091 |
| 2018/0329433 A1* | 11/2018 | Zhao | G05D 1/0094 |
| 2019/0185186 A1* | 6/2019 | Li | G06V 10/757 |
| 2020/0005655 A1* | 1/2020 | Schickel | G07C 5/0808 |
| 2020/0174503 A1 | 6/2020 | Cheikh et al. | |
| 2020/0207488 A1 | 7/2020 | Troy et al. | |
| 2020/0363822 A1* | 11/2020 | Georgeson | B64C 39/024 |
| 2020/0377233 A1* | 12/2020 | Harvey | B64D 47/02 |

OTHER PUBLICATIONS

European Patent Office, Extended Search Report, dated Jun. 21, 2023, regarding Application No. EP22213890.1, 10 pages.

Mikrut S. et al: "Studies on External Geometry of a Plane With Photogrammetric Methods and Laser Scanning", The International Archives of the Photogrammetry, Remote Sensing and Spatial Information Sciences, vol. XLIII-B2-2020, Aug. 12, 2020 (Aug. 12, 2020), pp. 459-464, XP93053119, DOI: 10.5194/isprs-archives-XLIII-B2-2020-459-2020.

European Patent Office, Examination Report, dated Nov. 12, 2024, regarding EP Application No. 22213890.1, 7 pages.

* cited by examiner

AUTOMATED METHOD AND SYSTEM FOR AIRCRAFT INSPECTION WITH DATA VALIDATION

BACKGROUND INFORMATION

1. Field

The present disclosure relates generally to automated inspection of aircraft and in particular, to inspecting aircraft in which captured data is validated prior to analysis of the captured data.

2. Background

Nondestructive testing is a group of analysis techniques used to evaluate properties of a material, component, or system, or other structure without causing damage to the unit under inspection. This nondestructive testing can also be referred to as nondestructive examination, nondestructive inspection, or nondestructive evaluation. These techniques are useful because they do not permanently alter the structure or component being inspected. Nondestructive testing can be performed in areas such as forensic engineering, mechanical engineering, petroleum engineering, electrical engineering, systems engineering, aerospace engineering, medicine, art, and other fields.

In the area of aerospace, aircraft inspections are performed for various regulatory and maintenance functions to maintain continued airworthiness. These inspections can include visual inspections. Visual inspections can be performed by maintenance personnel. These types of inspections are highly time and cost intensive requiring special skills that meet specified quality and safety criteria. An inspection of a commercial passenger aircraft can last up to several days and can involve multiple aircraft technicians, inspectors, and engineers using various types of inspection equipment.

Current use of semi-automated inspection systems requires captured images to be evaluated after capture for quality and applicability to desired image outcome without use of images or other related captured data such as for example, surface offset or location as an automated validation of operation.

SUMMARY

An example of the present disclosure provides a method for inspecting an aircraft. A computer system receives captured data associated with a flight path that is flown by an unmanned aircraft system to acquire the captured data for the aircraft. The computer system compares the captured data with reference data for the aircraft to form a comparison. The computer system determines whether the captured data is within a set of tolerances for valid captured data using a result of the comparison. Prior to detecting anomalies for the aircraft using the captured data, the computer system determines a set of corrective actions in response to the captured data being outside of the set of tolerances for the valid captured data in which the set of corrective actions is performed. According to other illustrative examples, a computer system and a computer program product for inspecting an aircraft are provided.

The features and functions can be achieved independently in various examples of the present disclosure or may be combined in yet other examples in which further details can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and features thereof, will best be understood by reference to the following detailed description of an illustrative example of the present disclosure when read in conjunction with the accompanying drawings, wherein:

DETAILED DESCRIPTION

Figure 1:
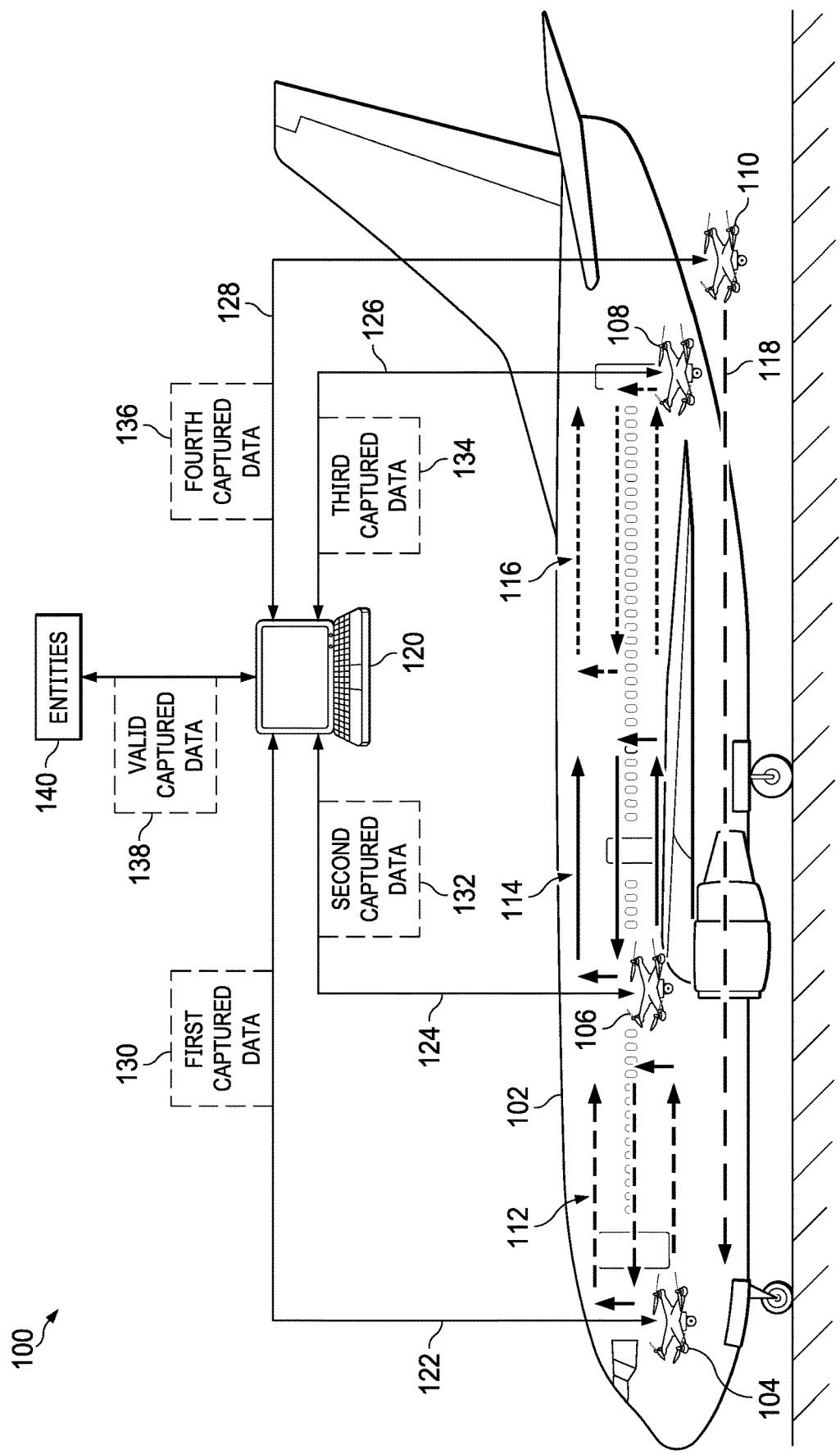
FIG. 1 is an illustration of an aircraft inspection environment that is depicted in accordance with an illustrative example.

The illustrative examples recognize and take into account one or more different considerations. For example, the illustrative examples recognize and take into account that unmanned aircraft systems (UAS) can be used for visual inspection of aircraft. In the illustrative examples, an unmanned aircraft system can include an unpiloted aerial vehicle (UAV) or combination of unpiloted aerial vehicles (UAVs), an unpiloted aerial vehicle controller, monitors for observing navigation, or other unmanned aircraft system components.

The illustrative examples recognize and take account that these inspections, however, may not be performed in a standard or consistent manner. As a result, the illustrative examples recognize and take account that variability in quality and untrustworthy results can occur. The illustrative examples recognize and take into account that conventional techniques can lead to questions about whether the data collected meets regulatory requirements or inspection procedural standards. The illustrative examples recognize and take into account that inconsistent quality results between inspections reduces the ability to make objective comparisons between aircraft or the same aircraft on different dates for aircraft condition assessment.

The illustrative examples recognize and take into account at least one of incorrectly flown flight paths or issues with data collection can result in undetected anomalies and undesired quality in the data collection. For example, issues with data collection can include, for example, out of focus images, features not within a field of view, low lighting, or other undesired issues that can be present in capturing images during data collection.

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

For example, the illustrative examples recognize and take into account that incorrectly traversed flight paths can occur from incorrectly planned paths, missed waypoints, out of order waypoints, flying too close or too far from target locations, unexpected obstacle avoidance maneuvers, and other sources. The illustrative examples recognize and take into account that issues with data collection can include poor lighting, images that are taken at improper locations, using an improper zoom value, incorrect aperture or shutter speed, out of focus, missing reference marks, missing targets, or other issues.

The illustrative examples recognize and take into account that conventional techniques provide images and videos to technicians and inspectors without a data validation process. The illustrative examples recognize and take into account that although the inspections meet various maintenance and planning and regulatory requirements. These guidelines do not currently define objective requirements to show that the data collection performed by an unmanned aircraft system via an automated or semi-automated process was valid as compared to a technicians guided inspection. As a result, the illustrative examples recognize and take account that images and videos acquired using unmanned aircraft systems may need intensive human operator analysis to determine whether sufficient data has been collected to meet regulatory requirements or maintenance procedures.

Therefore, it would be desirable to have a method and apparatus that takes into account at least some of the issues discussed above, as well as other possible issues. For example, it would be desirable to have a method and apparatus that overcome a technical problem with performing visual inspections of aircraft in a manner that involves less time and cost while improving quality, safety, accuracy, and repeatability.

Thus, illustrative examples provide a method, apparatus, system, and computer program product for inspecting an aircraft using unmanned aircraft systems with validation of the captured data acquired by the unmanned aircraft system. In the illustrative examples, captured data can include location, offset distance, image data, or a combination thereof.

In one illustrative example, captured data is received for a flight path flown by an unmanned aircraft system to acquire captured data about the aircraft condition. The captured data is compared with reference data for the aircraft to form a comparison. A determination is made as to whether the captured data is within a set of tolerances for valid captured data using the comparison. A determination of a set of corrective actions is made in response to the captured data being outside of the set of tolerances for valid captured data in which the set of corrective actions is performed prior to detecting anomalies for the aircraft using the captured data.

As used herein, a "set of" when used with reference items means one or more items. For example, a set of tolerances is one or more tolerances. As another example, set of corrective actions is one or more corrective actions.

With reference now to the figures and in particular with reference to FIG. 1, an illustration of an aircraft inspection environment is depicted in accordance with an illustrative example. In this depicted example, aircraft inspection environment 100 is an environment in which a commercial airplane 102 is an example of an aircraft that can be inspected using unmanned aircraft systems. The inspection can be performed to identify anomalies that may need maintenance. Further, this inspection can be performed to acquire data to meet regulatory requirements and enhance maintenance procedures in repair alternatives and predictive scheduling.

As depicted, the inspection is performed by first unmanned aircraft system (UAS) 104, second unmanned aircraft system (UAS) 106, third unmanned aircraft system (UAS) 108, and fourth unmanned aircraft system (UAS) 110. In this illustrative example, an unmanned aircraft system is an unpiloted aircraft that includes equipment used to control the unmanned aircraft remotely. An unmanned aircraft system can include more than one unpiloted aircraft. These unmanned aircraft systems have a capability that allows traversing the airplane inspection area for commercial airplane 102.

In the illustrative example, these unmanned aircraft systems operate an unmanned fashion following preplanned flight paths to capture data about commercial airplane 102 and comparative navigational aid data.

In one approach to inspecting commercial airplane 102, first unmanned aircraft system 104 flies on first flight path 112 to capture data about commercial airplane 102. Second unmanned aircraft system 106 flies on second flight path 114 to capture data about commercial airplane 102. Third unmanned aircraft system 108 flies on third flight path 116 to capture data about commercial airplane 102 and fourth unmanned aircraft system 110 flies on fourth flight path 118 to capture data about commercial airplane 102.

The unmanned aircraft systems in this illustrative example can stop at points on these depicted flight paths to capture data, such as image, location, or offset data. The captured image data can be images such as still images or images in a video. The captured image data can be for images other than in the visible part of the electromagnetic spectrum. For example, the image data can be for infrared (IR) or ultraviolent (UV) images.

As depicted, first unmanned aircraft system 104, second unmanned aircraft system 106, third unmanned aircraft system 108, and fourth unmanned aircraft system 110 are in communication with computer 120 using wireless communication links. As depicted, first unmanned aircraft system 104 can send first captured data 130 over first wireless communications link 122; second unmanned aircraft system 106 can send second captured data 132 over second wireless communications link 124; third unmanned aircraft system 108 can send third captured data 134 over third wireless communications link 126; and fourth unmanned aircraft system 110 can send fourth captured data 136 over fourth wireless communications link 128. This captured data can be transmitted by the unmanned aircraft systems to computer 120 while flying on the flight paths or after flying the flight paths.

In this illustrative example, computer 120 analyzes the captured image data received from the unmanned aircraft systems to determine whether captured data as a level of confidence for use in aircraft maintenance continued airworthiness assessment. Also in this illustrative example, location data is received from the unmanned aircraft systems to determine whether captured data as a level of confidence for use in proper location for image capture. This level of confidence can be determined by computer 120 analyzing the captured data to determine whether the flight paths were correctly flow using locations and offset distances in captured data as well as other location information such as drawings and inspection maps. The analysis can also include determining whether image data in the captured data contains features of interest and whether the captured data meets standards needed for analyzing the captured data to determine whether anomalies are present on commercial airplane 102.

In this example, the validation of the captured data can include captured location data and captured offset distance data recorded from the unmanned aircraft systems flying the fight paths. Captured location data includes locations of the unmanned aircraft systems and offset distance data for distances from the unmanned aircraft systems to a surface of commercial airplane 102. The captured data also includes image data recorded while the unmanned aircraft systems fly on the flight paths.

In the illustrative example, computer 120 can send valid captured data 138 to a set of operational entities that utilize the image data in aircraft maintenance if the captured data is determined to be valid. The set of entities can be selected from at least one of an airline, an airplane maintenance facility, a regulatory agency, or some other maintenance and airworthiness entity. Entities 140 can use the data for various purposes. For example, a regulatory agency can log the captured data within the regulators maintenance system that meets an inspection regulation. An airline or airplane maintenance facility can analyze the captured image data to determine whether anomalies are present and initiate maintenance as needed based on the results of the analysis of the captured data.

If the captured image data is determined to be invalid by the computer system, computer 120 can control the unmanned aircraft systems to perform addition data gathering flights with corrective actions to eliminate the cause of the invalid result. These corrective actions can include repeating image data capture for the flight path, changing settings for the sensors, and altering the flight path flown to acquire new captured image data. For example, if second captured data 132 is determined to be invalid, computer 120 can instruct second unmanned aircraft system 106 to repeat capturing data using second flight path 114 or a modified flight path. Further, computer 120 can change camera settings in second unmanned aircraft system 106. These and other corrective actions can be taken when second captured data 132 is invalid.

Thus, the illustrative example in FIG. 1 can provide captured data with a level of quality that can be used to determine whether anomalies are present that may need maintenance. As a result, airlines maintenance facilities and other entities using captured data for analysis do not need to validate the captured images have been properly acquired prior to performing analysis. Further, this captured data can also be used to meet regulations by regulatory agencies. With the validation of captured image and location data from unmanned aircraft systems, collecting corroborating information outside this automated maintenance inspection system to make decisions may be avoided or reduced. The corroborating information is information gathered from sources other than the automated maintenance inspection system. As result, delays in inspection processes and out of service time for aircraft can be reduced as well as improved quality records of the inspection results.

Although the illustrative example in FIG. 1 the unmanned aircraft systems outside of commercial airplane 102, unmanned aircraft systems can also be used for in-cabin or internal fuselage inspections.

Figure 2:
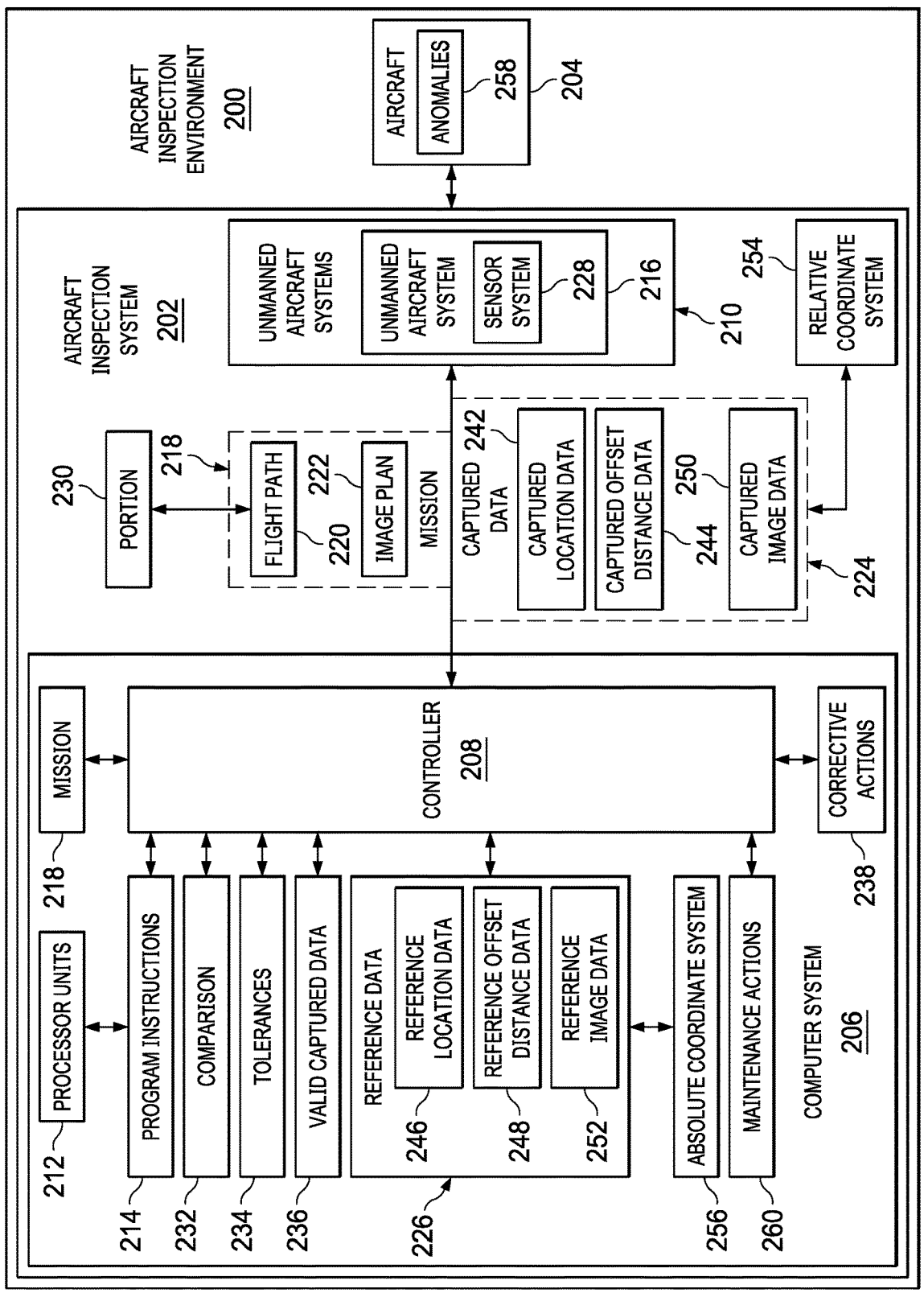
FIG. 2 is an illustration of an aircraft inspection environment in accordance with an illustrative example.

With reference next to FIG. 2, an illustration of an aircraft inspection environment is depicted in accordance with an illustrative example. The components in aircraft inspection environment 100 in FIG. 1 is example of components that can be implemented in aircraft inspection environment 200 in FIG. 2.

Aircraft inspection system 202 in aircraft inspection environment 200 can operate to inspect aircraft 204. Aircraft 204 can take a number of different forms. As used herein, a "number of" when used with reference items means one or more items. A number of different forms is one or more different forms.

For example, aircraft 204 can be selected from a group comprising one of a commercial aircraft, a commercial passenger airplane, a rotorcraft, a tilt-rotor aircraft, a tilt wing aircraft, a vertical takeoff and landing aircraft, an electrical vertical takeoff and landing vehicle, a partially manufactured aircraft, and other suitable types of aircraft.

In this illustrative example, aircraft inspection system 202 comprises a number of different components. As depicted, aircraft inspection system 202 comprises computer system 206, controller 208, and a set of unmanned aircraft systems 210.

Controller 208 can be implemented in software, hardware, firmware or a combination thereof. When software is used, the operations performed by controller 208 can be implemented in program code configured to run on hardware, such as a processor unit. When firmware is used, the operations performed by controller 208 can be implemented in program code and data and stored in persistent memory to run on a processor unit. When hardware is employed, the hardware can include circuits that operate to perform the operations in controller 208.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

In one illustrative example, controller 208 can be an automated analysis tool. For example, controller 208 can be an artificial intelligence system. The artificial intelligence system can be a machine learning model, a knowledge base, or some other suitable type of automated analysis program or software.

Computer system 206 is a physical hardware system and includes one or more data processing systems. When more than one data processing system is present in computer system 206, those data processing systems are in communication with each other using a communications medium. The communications medium can be a network. The data processing systems can be selected from at least one of a computer, a server computer, a tablet computer, or some other suitable data processing system.

As depicted, computer system 206 includes a number of processor units 212 that are capable of executing program instructions 214 implementing processes in the illustrative examples. As used herein a processor unit in the number of processor units 212 is a hardware device and is comprised of hardware circuits such as those on an integrated circuit that respond and process instructions and program code that operate a computer.

When a number of processor units 212 execute program instructions 214 for a process, the number of processor units 212 is one or more processor units that can be on the same computer or on different computers. In other words, the process can be distributed between processor units on the same or different computers in a computer system. Further, the number of processor units 212 can be of the same type or different type of processor units. For example, a number of processor units can be selected from at least one of a single core processor, a dual-core processor, a multi-processor core, a general-purpose central processing unit (CPU), a graphics processing unit (GPU), a digital signal processor (DSP), or some other type of processor unit.

In one illustrative example, unmanned aircraft system 216 in the set of unmanned aircraft systems 210 can operate using mission 218. Mission 218 can be uploaded to unmanned aircraft system 216 from controller 208.

In this illustrative example, mission 218 includes flight path 220 that defines a route to be flown by unmanned aircraft system 216 and image plan 222 that defines captured image data 250 is to be acquired by unmanned aircraft system 216 for aircraft 204 under inspection.

Controller 208 in computer system 206 receives captured data 224 for flight path 220 flown by an unmanned aircraft system 216 to inspect aircraft 204. In this example, this flight path is flown to acquire captured data 224 for aircraft 204 under inspection. Captured data 224 can include captured location data 242, captured offset distance data 244, and captured image data 250.

In this illustrative example, captured data 224 is acquired by sensor system 228 in unmanned aircraft system 216. Sensor system 228 can include sensors such as a global positioning system (GPS) receiver, inertial measurement unit (IMU), a laser range meter, a camera system, and other types of sensors that can acquire captured data 224.

Captured data 224 can be received from unmanned aircraft system 216 in a number of different ways. For example, captured data 224 can be received in real time over a wireless connection during flight of unmanned aircraft system 216 on flight path 220. When captured data 224 is received in real time from unmanned aircraft system 216 by controller 208 in computer system 206, captured data 224 is received as quickly as possible without any intentional delay.

In other illustrative examples, captured data 224 is received by controller 208 in computer system 206 periodically or after portions of flight path 220 have been flown by unmanned aircraft system 216. And in yet other illustrative examples, captured data 224 can be received by controller 208 in computer system 206 after unmanned aircraft system 216 has completed flying flight path 220.

In this illustrative example, controller 208 can receive captured data 224 for flight path 220 while unmanned aircraft system 216 is flying flight path 220. In this example, captured data 224 is for portion 230 of flight path 220 flown by unmanned aircraft system 216. In other words, captured data 224 can be sent for each portion of flight path 220 flown by unmanned aircraft system 216. In yet another illustrative example, captured data 224 can be sent in real time as unmanned aircraft system 216 flies on flight path 220. In other words, captured data 224 can be sent to and received by controller 208 without any intentional delay during the operation of unmanned aircraft system 216.

In another illustrative example, controller 208 can receive captured data 224 for flight path 220 after unmanned aircraft system 216 has completed flight path 220. With this example, captured data 224 is for all of flight path 220.

In this illustrative example, controller 208 compares captured data 224 with reference data 226 for aircraft 204 to form comparison 232. Controller 208 can determine whether captured data 224 is within a set of tolerances 234 for valid captured data 236 using the comparison 232.

The set of tolerances 234 can be at least one of a range, a threshold, a desired value, or other tolerance for captured data 224 relative to reference data 226. In other words, tolerances 234 defined how much variation can be in captured data 224 from reference data 226 in comparison 232 for captured data 224 to be considered valid captured data 236.

In one illustrative example, in comparing captured data 224 with reference data 226, controller 208 can compare captured data 224 with reference data 226, controller 208 can access captured location data 242 and captured offset distance data 244 for the unmanned aircraft system 216 in captured data 224. In making this comparison, controller 208 can also access reference location data 246 and reference offset distance data 248 in the reference data 226. Other data can also be present in captured data 224 such as an angle or angles of camera aiming components (e.g. gimbal) and other input parameters. Controller 208 then compares captured location data 242 and captured offset distance data 244 to reference location data 246 and reference offset distance data 248 respectively, to create comparison 232.

In another example, controller 208 can compare captured data 224 with reference data 226 by accessing captured image data 250 in captured data 224; access reference image data 252 in reference data 226; and compare captured image data 250 with reference image data 252 to form comparison 232.

In yet another was example, comparison 232 can be made by controller 208 accessing captured location data 242, captured offset distance data 244, and captured image data 250 in captured data 224. Controller 208 can also access reference location data 246, reference offset distance data 248, and reference image data 252 in reference data 226. Controller 208 compares captured location data 242, captured offset distance data 244, and captured image data 250 to reference location data 246, reference offset distance data 248, and reference image data 252, respectively, to form the comparison 232.

In this illustrative example, reference data 226 can be generated for comparison in a number of different ways. For example, controller 208 can create reference location data 246 and reference offset distance data 248 using at least one of a computer aided design (CAD) model of the aircraft, point cloud scans, historical flight paths from one or more prior inspections of aircraft 204, other similar aircraft, or from other sources. Controller 208 can create reference image data 252 creating, by the computer system, the reference image data using at least one of a computer aided design model of aircraft 204, a point cloud scan of aircraft 204, historical images of aircraft 204, other similar aircraft, or other sources of information about aircraft 204.

In this illustrative example, captured data 224 is defined in absolute coordinate system 256. Absolute coordinate system 256 can have coordinates that are defined using a coordinate system, such as latitude, longitude, and altitude.

In this example, reference data 226 is defined using relative coordinate system 254. In this example, reference location data 246 can be defined using relative coordinate system 254 for aircraft 204. Relative coordinate system 254 can be defined using an origin that is relative to a point or location on or in aircraft 204. For example, the origin can be the nose of aircraft 204. In other words, captured location data 242 describes locations using relative coordinate system 254.

In this illustrative example, controller 208 converts one of the coordinate systems into the other coordinate system such that both captured data 224 and reference data 226 are described using the same coordinate system. This process can also be referred to as aligning the coordinate systems such that the data uses the same coordinate system.

In the illustrative example, captured data 224 is converted from using absolute coordinate system 256 to relative coordinate system 254 to compare captured data 224 and reference data 226 to generate comparison 232.

When captured data 224 is not valid captured data 236, controller 208 determines a set of corrective actions 238 in response to the captured data 224 being outside of the set of tolerances 234 for valid captured data 236. In this example, the set of corrective actions 238 is performed prior to detecting anomalies 258 for the aircraft 204 using captured data 224.

The set of corrective actions 238 can take a number different forms. For example, the set of corrective actions 238 is selected from at least one of repeating capturing data for the flight path, repeating image generation for a portion of the flight path on which captured data is invalid, repeating capturing data using an adjusted flight path, adjusting settings of a camera system in sensor system 228 on the unmanned aircraft system 216, or other suitable actions.

The set of corrective actions 238 can be performed in a number of different ways. For example, the set of corrective actions 238 can be using at least one of unmanned aircraft system 216 for another unmanned aircraft system in unmanned aircraft systems 210. In other words, the same unmanned aircraft system generating invalid captured data can be used to re-capture data. In another example, a different unmanned aircraft system can be used. In yet another example, the same unmanned aircraft system and one or more other unmanned aircraft systems to be used to capture data from flight path 220.

When captured location data 242 is valid, controller 208 can perform a number of different actions with captured location data 242. For example, controller 208 can indicate that captured location data 242 is valid for analysis in response to determining that captured data 224 is valid. Captured location data 242 can be collected for a number of different functions including regulatory, planning, management, maintenance, predictive maintenance or other types of functions. This indication can be used to initiate action such as logging or recording captured data 224 as well as the results in comparison 232.

As another example, when captured data 224 is valid, another action that can be formed is analyzing captured data 224 for a set of anomalies 258 for aircraft 204. Based on the set of anomalies 258 identified, a set of maintenance actions 260 can be performed for aircraft 204. If a set of anomalies 258 is found in the analysis, then maintenance actions 260 can be scheduled to resolve the set of anomalies 258.

In this example, performing the set of maintenance actions 260 can include resolving the set of anomalies 258 through at least one of repair, rework, replacement, or other actions. The set of maintenance actions 260 can also include flying unmanned aircraft system 216 on a portion 230 of flight path 220 where the set of anomalies 258 were located after maintenance is performed on the set of anomalies 258. In other words, another inspection of aircraft 204 can be performed using unmanned aircraft system 216 after resolving the set of anomalies 258. This inspection can include repeating receiving captured location data 242 for portion 230 of flight path 220 flown by unmanned aircraft system 216 to acquire captured data 224 for aircraft 204; comparing captured data 224 with reference data 226 for aircraft 204 to form comparison 232; determining whether captured data 224 is within the set of tolerances 234 for valid captured data 236 using comparison 232; and determining the set of corrective actions 238 in response to captured data 224 being outside of the set of tolerances 234 for valid captured data 236 prior to detecting the set of anomalies 258 for aircraft 204 using captured data 224.

In one illustrative example, one or more solutions are present that overcome a problem with performing inspections using unmanned aircraft systems. As a result, one or more solutions can provide an ability to acquire data from inspecting an aircraft that is validated and can be used to perform actions such as maintenance scheduling, fleet planning, fleet management, aircraft analysis, and other actions.

Computer system 206 can be configured to perform at least one of the steps, operations, or actions described in the different illustrative examples using software, hardware, firmware or a combination thereof. As a result, computer system 206 operates as a special purpose computer system in which controller 208 in computer system 206 enables inspecting aircraft in a more effective manner as compared to current techniques for inspecting aircraft. In particular, controller 208 transforms computer system 206 into a special purpose computer system as compared to currently available general computer systems that do not have controller 208.

In the illustrative example, the use of controller 208 in computer system 206 integrates processes into a practical application for inspecting aircraft in which the captured data for the flight path flown by the unmanned aircraft system can be validated. This validation includes validating the flight path three-dimensional locations, offset distance data, and image data prior to performing analysis to discover anomalies. Further, controller 208 can provide indications of validity in a manner that is acceptable for use by aviation regulators, airlines, maintenance facilities, and other entities. In this manner, the inspection performed using aircraft inspection system 202 can be used in place of or in addition to manual inspections.

Figure 3:
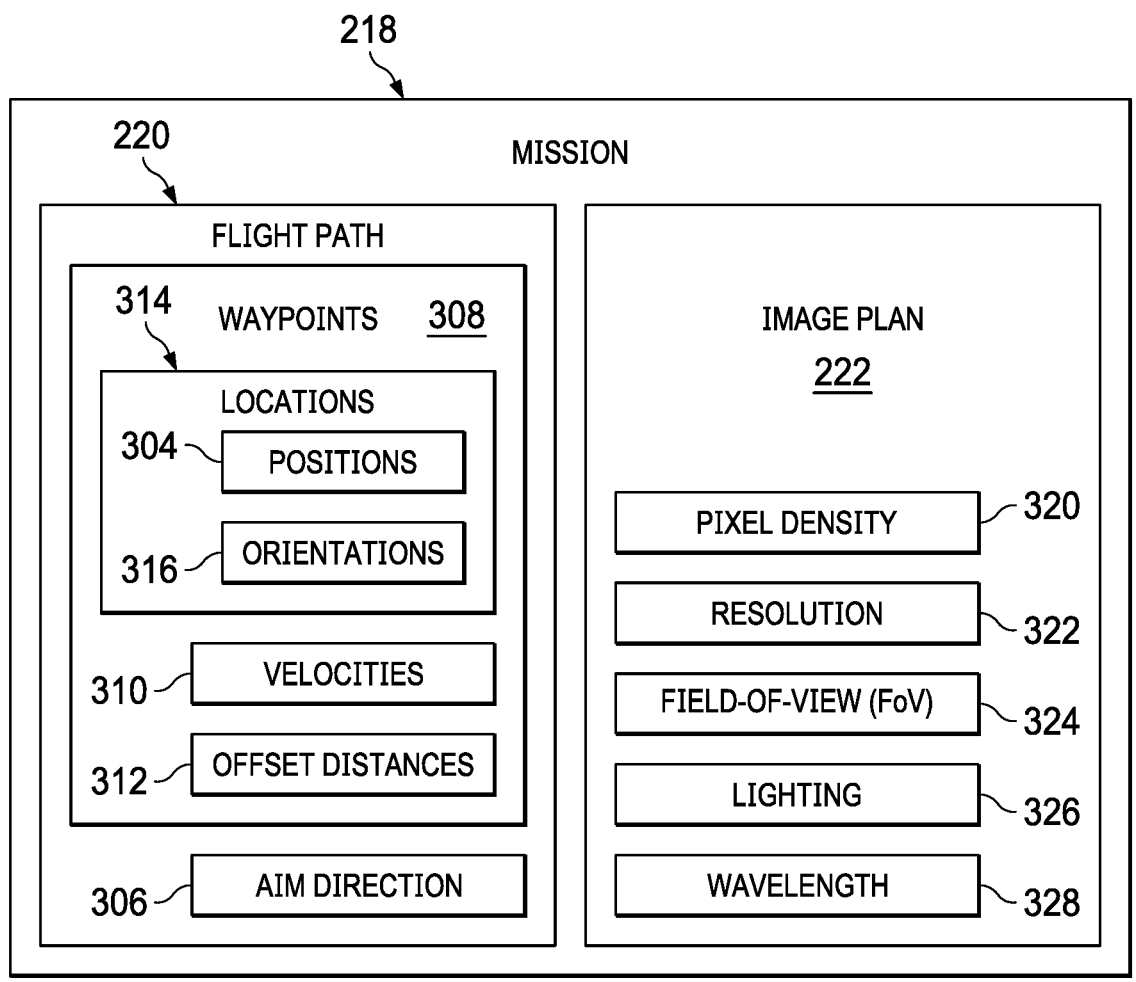
FIG. 3 is an illustration of a mission in accordance with an illustrative example.

Turning next to FIG. 3, an illustration of a mission is depicted in accordance with an illustrative example. In the illustrative examples, the same reference numeral may be used in more than one figure. This reuse of a reference numeral in different figures represents the same element in the different figures.

The illustration of example components in mission 218 is depicted in this example, as illustrated, mission 218 comprises flight path 220 and image plan 302.

Flight path 220 includes number of different components. As depicted, flight path 220 comprises waypoints 308 can be used for location and navigation to acquire captured data 224. Waypoints 308 include locations 314, velocities 310, and offset distances 312.

Locations 314 include positions 304 in three-dimensional space that unmanned aircraft system 216 will fly for flight path 220. For example, a position can be the x, y, z coordinates of the unmanned aircraft system.

Locations 314 can also include orientations 316. An orientation can be the orientation of unmanned aircraft system 216. The orientation can be described using roll, pitch, and yaw. Orientations 316 can change over different portions of flight path 220.

As depicted, velocities 310 in waypoints 308 are the speeds and directions at which unmanned aircraft system 216 flies on flight path 220. Velocities 310 can vary over portions of flight path 220.

Flight path 220 can also include aim direction 306. Aim direction 306 defines the aiming direction of the camera and sensors in sensor system 228 in unmanned aircraft system 216. This aiming direction may involve multiple rotation axes that are set by a rotation control mechanism like a gimbal, which can control a pan axis and a tilt axis (otherwise known as azimuth and elevation, respectively), which serve to point the camera and sensors in a specific direction.

Offset distances 312 in waypoints 308 are the distances between unmanned aircraft system 216 and the surface of aircraft 204. These distances are distances expected or that are optimal for safely flying unmanned aircraft system 216 near the aircraft 204 and for capturing captured image data 250.

In this illustrative example, image plan 222 is information used for acquiring captured image data 250. Captured image data 250 that can be a sequence of still images or images in a video.

In this illustrative example, image plan 222 includes a number of different components. As depicted, image plan 222 comprises pixel density 320, resolution 322, field of view (FoV) 324, lighting 326, and wavelength 328.

Pixel density 320 is the number of pixels within an area of an image acquired by the camera. Pixel density can be, for example, measured in pixels per inch. Resolution 322 is the amount of detail that can be held in an image acquired by a camera in sensor system 228 in unmanned aircraft system 216. Field of view 324 is an angle (or in some cases separate horizontal and vertical angles) that represents the extents of the environment that can be viewed and captured by the camera and/or sensor system 228. The field of view can be measured in degrees.

Lighting 326 is the amount of light desired for capturing images. Wavelength 328 the portion of the electromagnetic spectrum for which images are to be captured by the camera and sensor system 228. Wavelength 328 can include at least one of visible light, infrared light, ultraviolet rays, or other wavelengths.

Figure 4:
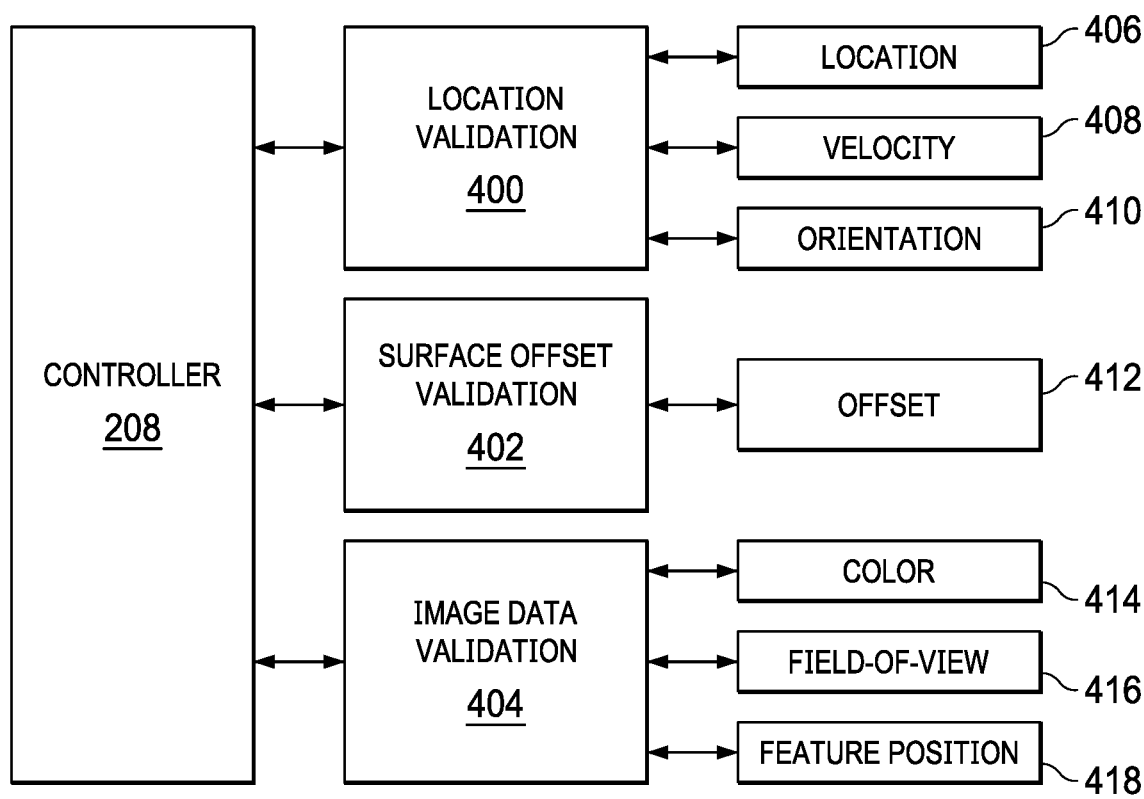
FIG. 4 is an illustration of dataflow for validating captured data in accordance with an illustrative example.

Turning next to FIG. 4, an illustration of dataflow for validating captured data is depicted in accordance with an illustrative example. In this illustrative example, controller 208 performs a number of validations in determining whether captured data 224 is valid captured data 236. As depicted, controller 208 performs location validation 400, surface offset validation 402, and image data validation 404. In this illustrative example, these validations can be performed using reference data 226 and captured data 224. The allowed deviations used in these validations can be found in the set of tolerances 234 in FIG. 2.

In location validation 400, the validation process used is independent of the source of the three-dimensional location data analyzed in this process. For example, the three-dimensional location data could be provided by a differential global positioning system (GPS) receiver, a simultaneous localization and mapping (SLAM) system, motion capture motion capture system, or other types of three-dimensional localization systems.

In this example, the three-dimensional location is described using x, y, z coordinates.

Location validation 400 can be performed by controller 208 performing checks on location 406, velocity 408, and orientation 410 in determining whether captured location data 242 is valid. In this example, location 406 can be validated for each location in captured location data 242.

In this illustrative example, location 406 can be validated using reference location, X; reference location, Y; reference location, Z; captured location, X; captured location, Y; captured location, Z; and allowed location deviation. A difference between the reference location values and captured location values can be calculated to obtain a location deviation. This location deviation can be compared to the allowed location deviation determine whether the location is valid.

In this illustrative example, velocity 408 can be validated in location validation 400 using reference velocity, X; reference velocity, Y; reference velocity, Z; captured velocity, X; captured velocity, Y; captured velocity, Z; and allowed velocity deviation. A difference between the reference velocity values and the captured velocity values can be calculated to obtain a velocity difference. This velocity difference can be compared with the allowed velocity deviation to determine whether the velocity for this data point is valid. In this illustrative example, the velocity should be "0" at time of image capture.

A similar check can be performed on orientation 410 as part of location validation 400. This check can be performed using reference angle, roll; reference angle, pitch; reference angle, yaw; captured angle, roll; captured angle, pitch; captured angle, yaw; and allowed angle deviation.

The orientation deviation can be calculated by taking the difference between the reference angles for orientation and the captured angles orientation. The orientation deviation can be compared to allowed angle deviation whether the orientation is valid.

In this illustrative example, surface offset validation 402 is a validation of the distances from the unmanned aircraft system camera lens to the surface of aircraft. This validation can be performed for each location of interest. Surface offset validation 402 for offset 412 can be performed using reference offset distance in reference offset distance data 248; captured offset distance in captured offset distance data 244; and allowed offset distance deviation. The difference between the reference offset distance and the captured offset distance is calculated to obtain and offset distance deviation. This offset distance deviation can be used to determine whether offset 412 from the unmanned aircraft system to the surface of the aircraft is valid for the data point being evaluated.

In this illustrative example, image data validation 404 can be performed by controller 208 for various parameters in image plan 222. As depicted in this example, image data validation 404 is performed by checking one or more parameters such as color 414, field of view (FoV) 416, and feature position 418.

As depicted, color 414 can be validated in image data validation 404 using reference color, R; reference color, G; reference color, B; captured color, R; captured color, G; captured color, B; allowed color deviation, R; allowed color deviation, G; allowed color deviation, B.

In this illustrative example, the color deviation can be calculated as a difference between the reference color and the captured color for the RGB values. In this illustrative example, color deviation, R; color deviation, G; and color deviation, B the calculated from these differences. These deviations can be compared with allowed color deviation, R; allowed color deviation, G; allowed color deviation, B, respectively, to determine whether the color 414 is valid. This color can be for a sampling of pixels in the captured image.

Field of view 416 can be validated using reference field of view; actual field of view; and allowed field of view deviation. The field of view deviation can be calculated as the difference between the reference field of view and the actual field of view. The field of view deviation can be compared with allowed field of view deviation to determine whether the field of view 416 is valid.

Feature position 418 for a feature or a list of features can be validated using reference feature position (in pixel dimensions), px; reference feature position, py; captured feature position, px; captured feature position, py; and allowed feature position deviation for a feature of interest in the images. This validation of feature position 418 can be performed for one or more features in an image. The feature can be, for example, a rivet, a fairing, portal, a joint, or some other suitable feature on aircraft.

The position deviation can be calculated as the difference between the reference feature position coordinates and the captured feature position coordinates. The position deviation can be compared to the allowed feature deviation to determine whether feature position 418 is valid.

The illustration of image data validation 404 in this figure is provided an example and not meant to limit the manner in which validation can be performed in other illustrative examples. In other illustrative examples, validations using other data can be performed in addition to or in place of the validations depicted in this figure. For example, other types of image data can be validated in image data validation in addition to or in place of color 414, field of view 416, and feature position 418. For example, other parameters that can be validated include at least one of focus, intensity, lighting, or other suitable parameters.

The illustration of aircraft inspection environment 200 and the different components in FIG. 2-4 is not meant to imply physical or architectural limitations to the manner in which an illustrative example may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative example.

For example, one or more in unmanned aircraft systems in unmanned aircraft systems 210 in addition to unmanned aircraft system 216 can fly flight paths to inspect aircraft 204. Further, one or more unmanned aircraft systems in unmanned aircraft systems 210 can fly flight path 220. This flight may be flown by more than one unmanned aircraft system when different types of sensors are located on the sensor systems in unmanned aircraft systems 210. In yet another illustrative example, controller 208 can control another unmanned aircraft system in unmanned aircraft systems 210 to inspect another aircraft in addition to aircraft 204.

As another example, aircraft inspection system 202 can be configured to inspect aircraft 204 using other types of motion platforms or systems in addition to or in place of unmanned aircraft systems 210. For example, vehicles selected from at least one of a crawler, an underwater unmanned vehicle (UUV), a remotely operate vehicle (ROV), an autonomous underwater vehicle (AUV), a stationary inspection robot with an arm, or other systems suitable for acquiring captured data 224 along a path for route control by controller 208.

Figure 5:
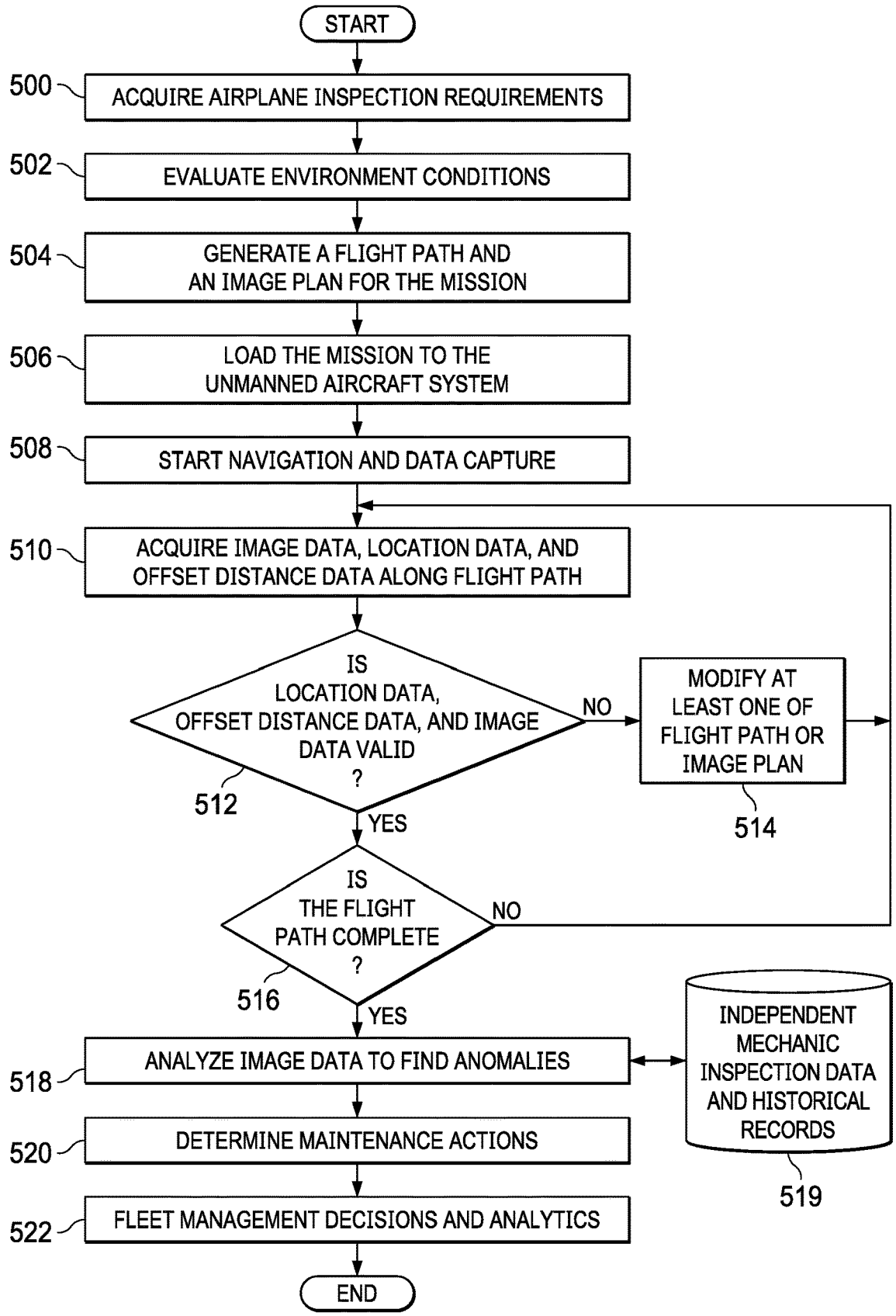
FIG. 5 an illustration of a flowchart of a process for inspecting an aircraft in accordance with an illustrative example.

In FIG. 5 an illustration of a flowchart of a process for inspecting an aircraft is depicted in accordance with an illustrative example. The process in FIG. 5 can be implemented in hardware, software, or both. When implemented in software, the process can take the form of program code that is run by one of more processor units located in one or more hardware devices in one or more computer systems. For example, the process can be implemented in controller 208 in computer system 206 in FIG. 2. This process can be implemented using unmanned aircraft systems 210 to capture data.

The process begins by acquiring airplane inspection requirements (operation 500). These requirements can be obtained from various sources such manufacturer's requirements, a knowledgebase, use cases, and other sources. This information can be used to identify inspection areas as well as particular features on the aircraft. Features can include, for example, an antenna, a fairing, a wing surface, a door, a slat, a flap, an aileron, or other as features on aircraft that should be inspected. These requirements can be located in a database by particular aircraft and uploaded in operation 500.

The process then evaluates environment conditions (operation 502). Aircraft maintenance is performed in many environments. Some factors include for example lighting (e.g., reflection or glare from light sources, or shadows), temperature, air current, weather conditions (e.g., fog/smog, rain, etc.) and physical hanger layout. Aircraft inspection using unmanned aircraft systems takes into account the environment conditions to operate effectively.

The process generates a flight path and an image plan for a mission (operation 504). In operation 504, the process can use CAD model data or point cloud data, and path planning algorithms generate location data and offset distance data for the flight path. The process can also use CAD model data or point cloud data to determine specifics for imaging different areas for features on the aircraft. This mission is used by the unmanned aircraft system to perform the inspection of the aircraft. The illustrative example, the flight path generated takes into account the airplane inspection requirements determined in operation 500 and environmental conditions evaluated in step 502.

The process loads the mission to the unmanned aircraft system (operation 506). The process then starts navigation and data capture (operation 508). In this operation, the unmanned aircraft system executes the mission including flying on the flight path. In the illustrative example, this operation is performed autonomously by the unmanned aircraft system. In other illustrative examples, human operator can remotely pilot some aspects of the unmanned aircraft system.

The process acquires image data, location data, and offset distance data along flight path (operation 510). In this operation, the process acquires three-dimensional position and orientation data from the environment. This data can be acquired using, for example, an inertial measurement unit (IMU), light detection and ranging (LIDAR) system, a differential global positioning system (GPS) receiver, vision based localization or motion capture system. Image data can be acquired using one or more cameras on the unmanned aircraft system.

The process determines whether the location data, offset distance data, and image data are valid (operation 512). In operation 512, the process can validate the three-dimensional location data captured from three-dimensional localization sensors, such as a differential global positioning system (GPS) receiver, simultaneous localization mapping (SLAM) sensor, or a motion capture system. This captured location data can be compared to reference location data with variations in the comparison process being to specified tolerances.

In operation 512, offset distance data is the distance to surface of the aircraft or component under inspection from the unmanned aircraft system and can be compared to the reference offset distance data. Variations in this comparison can become paired with specified tolerances.

In this illustrative example, imaging data can be validated by comparing acquired images in the captured image data to the reference image data to analyze parameters such as colors, field of view (FoV), and general feature positions, or other aspects of the image.

If the location data, offset distance data, and image data are not valid, the process modifies at least one of the flight path or image plan for the unmanned aircraft system (operation 514). This modification can be performed by making adjustments to at least one of the flight path or image parameters to meet at least one of position or image tolerance requirements. The process then returns to operation 510 as described above.

For example, a shadow or reflection on a part of the aircraft camera and resulting image data being insufficient for analysis. With a reflection or shadow, image data for the part can be captured by modifying the flight path to capture image data from another angle or location. As another example, if low visibility conditions exist, the offset distance, a resolution of image, or other parameters in the image plan can be changed in operation 514.

With reference again to operation 512, if location data, offset distance data, and image data are valid, the process determines whether the flight path is complete (operation 516). If the flight path is not complete, the process returns to operation 510.

If the flight path is complete, the process analyzes the image data to find anomalies (operation 518). This analysis in operation 518 can be made using independent mechanic inspection data and historical records 519. These records can be generated to conduct mechanic manual inspections of the aircraft that references anomaly type, location, and size. Further, a mechanic image review from images captured by the unmanned aircraft system can be performed in which the review notes anomaly type, location, and size. These records can also include the results of a statistical analysis of comparisons between mechanic manual inspections and mechanic image review.

For example, comparison of the image analysis can be made to a manual account inspection of aircraft to generate the comparison between anomalies detected by image analysis and anomalies detected by mechanic manual inspection.

The process can also confirm unmanned aircraft system image equivalency to mechanic manual inspection.

Maintenance actions can be determined using the validated captured data (operation 520). The maintenance actions needed depends on whether anomalies are found and if anomalies are found, the maintenance actions depend the type of anomalies present on the aircraft.

Fleet management decisions and analytics can be performed when using the validated captured data and the results of anomaly analysis (operation 522). The process terminates thereafter. In operation 522, images and dispositions can be stored in a database for determining alternate or more effective inspection requirements. This database can include the identification of anomalies for aircraft of the same type and for specific aircraft to maintain a history for types of aircraft as well as individual aircraft.

Figure 6:
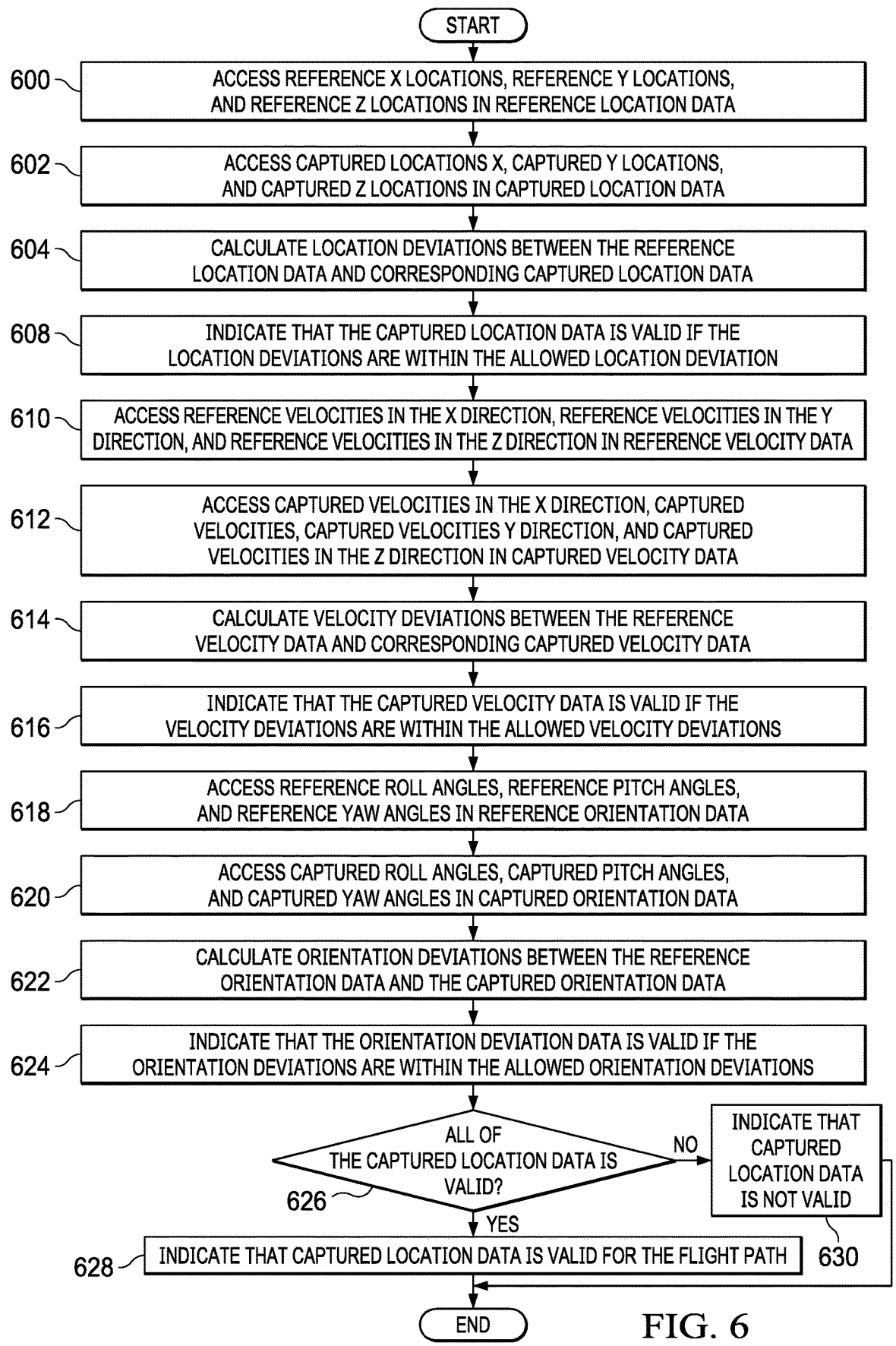
FIG. 6, a flowchart of a process for validating captured location data in accordance with an illustrative example.

With reference now to FIG. 6, a flowchart of a process for validating captured location data is depicted in accordance with an illustrative example. The process illustrated in FIG. 6 can be used in operation 512 in FIG. 5 to determine whether captured location data is valid for use in analysis. This process is independent of the source of the captured location data. The data comparison check performed in this process can be performed for each location in the captured location data for the flight path flown by the unmanned aircraft system. This process is also an example of location validation 400 performed by controller 208 in FIG. 4.

The process begins by accessing reference x locations, reference y locations, and reference z locations in reference location data (operation 600). In this depicted example, the location data is three-dimensional location data in a Cartesian coordinate system using x,y,z coordinates.

The process accesses captured locations x, captured y locations, and captured z locations in captured location data (operation 602). In this example, each reference location in the reference location data has a corresponding captured location in the captured location data. The process then calculates location deviations between the reference location data and corresponding captured location data (operation 604).

The process indicates that the captured location data is valid if the location deviations are within the allowed location deviation (operation 608).

The process then accesses reference velocities in the x direction, reference velocities in the y direction, and reference velocities in the z direction in reference velocity data (operation 610). The process then accesses captured velocities in the x direction, captured velocities, captured velocities y direction, and captured velocities in the z direction in captured velocity data (operation 612). In this example, each reference velocity in the reference velocity data has a corresponding captured velocity in the captured velocity data.

The process calculates velocity deviations between the reference velocity data and corresponding captured velocity data (operation 614). In this example, each captured velocity in the captured velocity data has a corresponding reference velocity in the reference velocity data. The process indicates that the captured velocity data is valid if the velocity deviations are within the allowed velocity deviations (operation 616).

The process accesses reference roll angles, reference pitch angles, and reference yaw angles in reference orientation data (operation 618). The process accesses captured roll angles, captured pitch angles, and captured yaw angles in captured orientation data (operation 620). In this example, each reference orientation angle in the reference location data has a captured reference orientation angle in the captured location data.

The process calculates orientation deviations between the reference orientation data and the captured orientation data (operation 622). The process indicates that the orientation deviation data is valid if the orientation deviations are within the allowed orientation deviations (operation 624).

A determination is made as to whether all of the captured location data is valid (operation 626). If all of the captured location data is valid, the process indicates that captured location data is valid for the flight path (operation 628) with the process determining thereafter. Otherwise, the process indicates that captured location data is not valid (operation 630) with the process terminating thereafter. The indications can include indicating each deviation that is in or out of tolerance.

Figure 7:
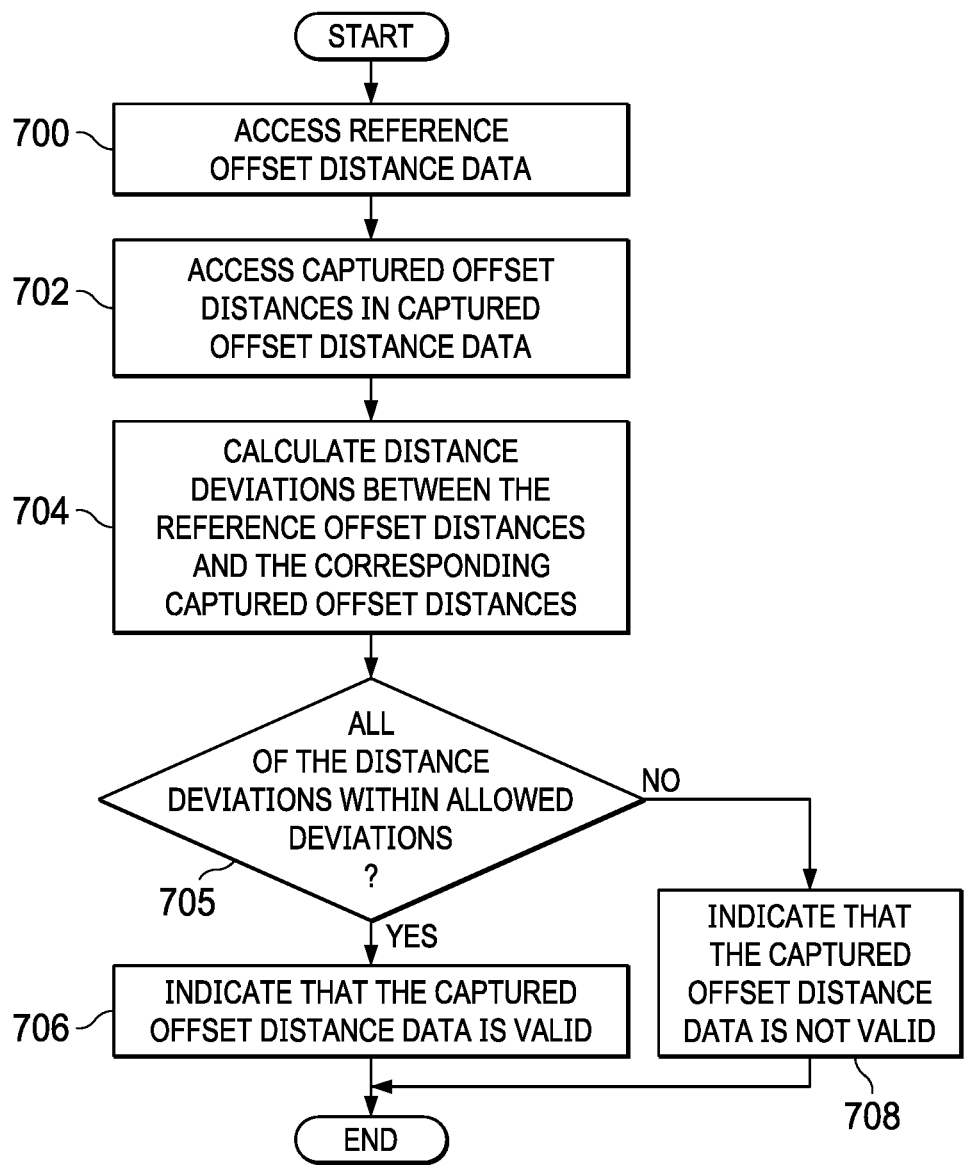
FIG. 7, a flowchart of a process for validating captured offset distance data location data in accordance with an illustrative example.

With reference now to FIG. 7, a flowchart of a process for validating captured offset distance data is depicted in accordance with an illustrative example. The process illustrated in FIG. 7 can be used in operation 512 in FIG. 5 to determine whether captured offset distance data is valid for use in analysis. This process is also an example of surface offset validation 402 performed by controller 208 in FIG. 4.

The process begins by accessing reference offset distance data (operation 700). The process accesses captured offset distances in captured offset distance data (702). In this example, each reference offset distance has a corresponding captured offset distance.

The process calculates distance deviations between the reference offset distances and the corresponding captured offset distances (operation 704). A determination is made as to whether all of the distance deviations are within allowed deviations (operation 705). If all of the captured location data is valid. If all of the distance deviations are within allowed deviations, the process indicates that the captured offset distance data is valid (operation 706) with process terminating thereafter. Otherwise, the process indicates that the captured offset distance data is not valid (operation 708) with process terminating thereafter. The indication can include indicating each distance deviation that is in tolerance or out of tolerance.

Figure 8:
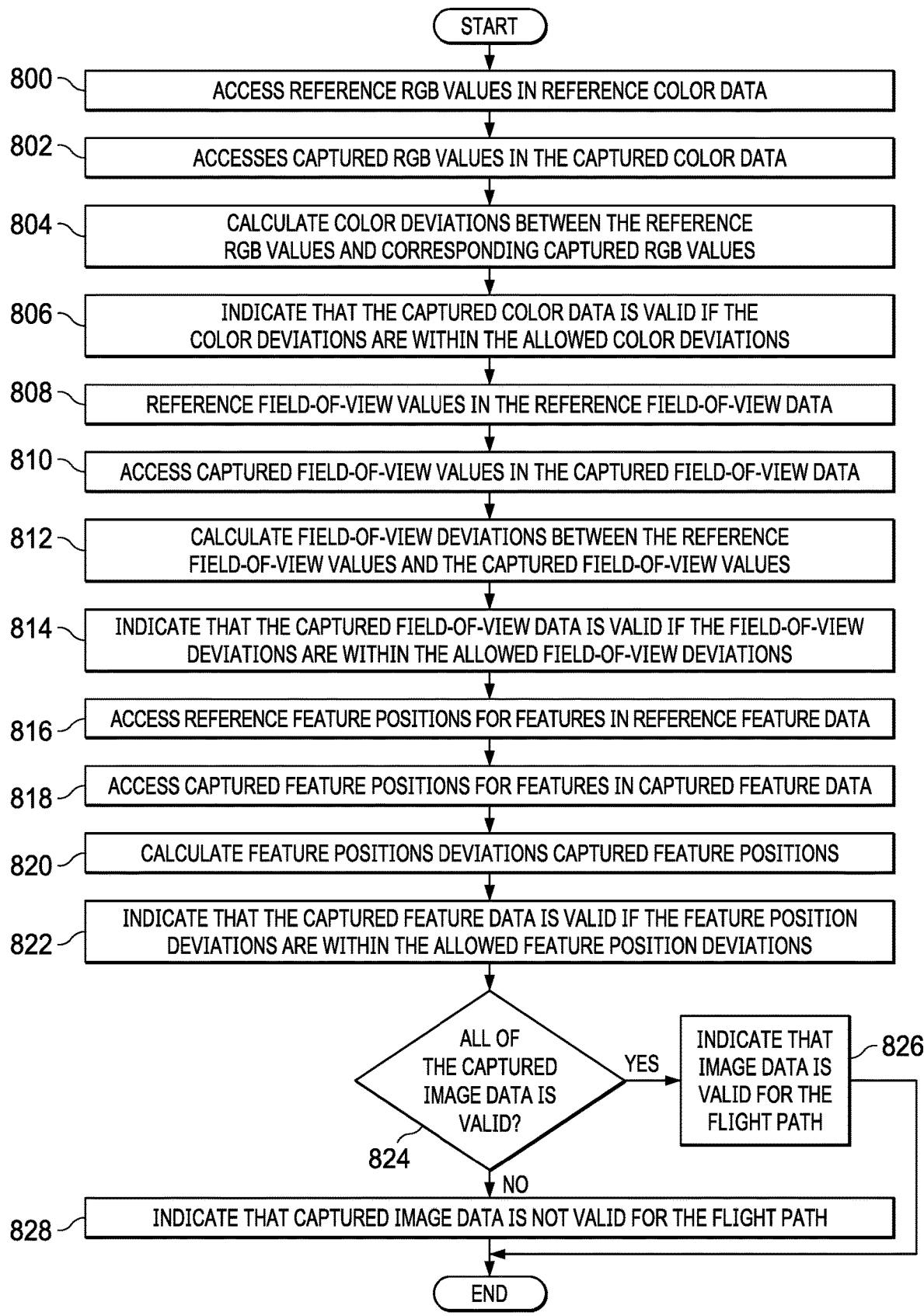
FIG. 8, a flowchart of a process for validating image data in accordance with an illustrative example.

With reference now to FIG. 8, a flowchart of a process for validating image data is depicted in accordance with an illustrative example. The process illustrated in FIG. 8 can be used in operation 512 in FIG. 5 to determine whether image data is valid for use in analysis. This process is also an example of image data validation 404 performed by controller 208 in FIG. 4.

The process begins by accessing reference RGB values in reference color data (operation 800). The process accesses a captured RGB values in the captured color data (operation 802). In this example, each reference R (red) value, reference G (green) value, and reference B (blue) value in the reference color data has a corresponding captured R value, captured G value, and captured B value in the captured color data. The process then calculates color deviations between the reference RGB values and corresponding captured RGB values (operation 804).

The process indicates that the captured color data is valid if the color deviations are within the allowed color deviations (operation 806).

The process reference field of view values in the reference field of view data (operations 808). The process accesses captured field of view values in the captured field of view data (operation 810).

The process calculates field of view deviations between the reference field of view values and the captured field of view values (operation 812). The process indicates that the captured field of view data is valid if the field of view deviations are within allowed field of view deviations (operation 814).

The process accesses reference feature positions for features in reference feature data (operation 816). In this illustrative example, a feature positions for a feature in an image can be described using x,y pixel coordinates. The process accesses captured feature positions for features in captured feature data (operation 818). In this example, each reference feature positions for a feature has a corresponding captured feature position for the feature.

The process calculates feature position deviations for captured feature positions (operation 820). The process indicates that the captured feature data is valid if the feature positions deviations are within allowed feature position deviations (operation 822).

A determination is then made as to whether all of the captured image data is valid (operation 824). If all of the captured location data is valid, the process indicates that the image data is valid for the flight path (operation 826) with the process determining thereafter. Otherwise, the process indicates that the captured image data is not valid for the flight path (operation 828) with the process terminating thereafter. The indications can include indicating each deviation that is in or out of tolerance.

Figure 9:
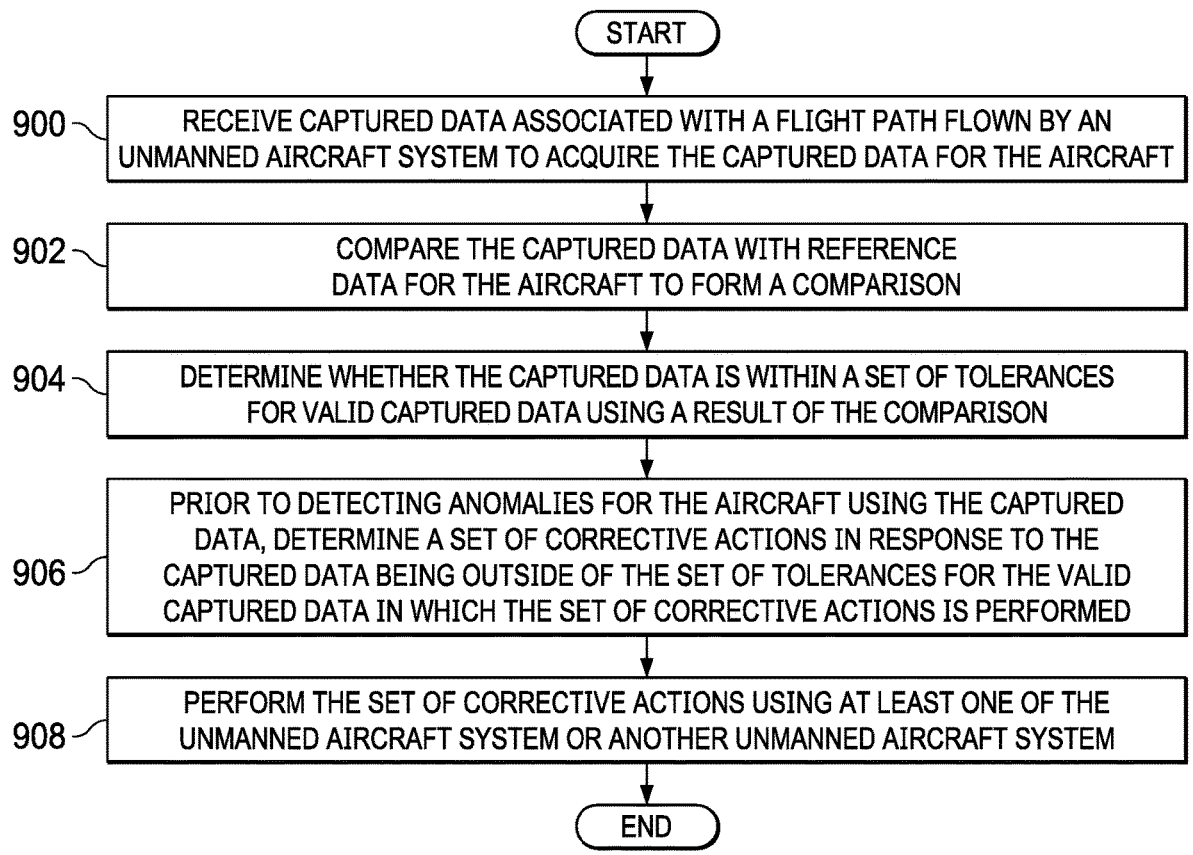
FIG. 9 is an illustration of a flowchart of a process for inspecting an aircraft in accordance with an illustrative example.

Turning next to FIG. 9 an illustration of a flowchart of a process for inspecting an aircraft is depicted in accordance with an illustrative example. The process in FIG. 9 can be implemented in hardware, software, or both. When implemented in software, the process can take the form of program code that is run by one of more processor units located in one or more hardware devices in one or more computer systems. For example, the process can be implemented in controller 208 in computer system 206 in FIG. 2.

The process begins by receiving captured data for a flight path flown by an unmanned aircraft system to acquire the captured data for the aircraft (operation 900). The process compares the captured data with reference data for the aircraft to form a comparison (operation 902).

The process determines whether the captured data is within a set of tolerances for valid captured data using the comparison (operation 904). The process determines a set of corrective actions in response to the captured data being outside of the set of tolerances for the valid captured data in which the set of corrective actions is performed prior to detecting anomalies for the aircraft using the captured data (operation 906).

The process performs the set of corrective actions using at least one of the unmanned aircraft system or another unmanned aircraft system (operation 908). The process terminates thereafter.

Figure 10:
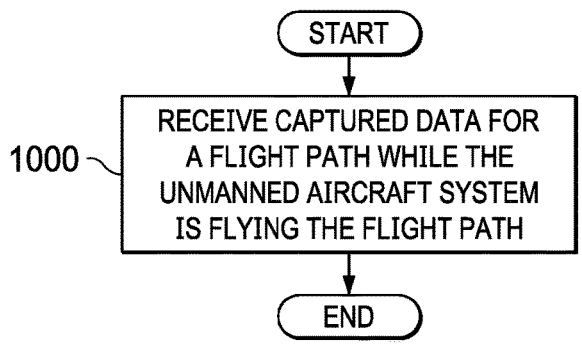
FIG. 10 is an illustration of a flowchart of a process for receiving captured data in accordance with an illustrative example.

With reference next to FIG. 10, an illustration of a flowchart of a process for receiving captured location data is depicted in accordance with an illustrative example. The process illustrated in FIG. 10 is an example of one implementation for operation at 900 in FIG. 9.

The process receives the captured location data for the flight path while the unmanned aircraft system is flying the flight path (operation 1000). The process terminates thereafter. The captured data is for a portion of the flight path flown by the unmanned aircraft system.

Figure 11:
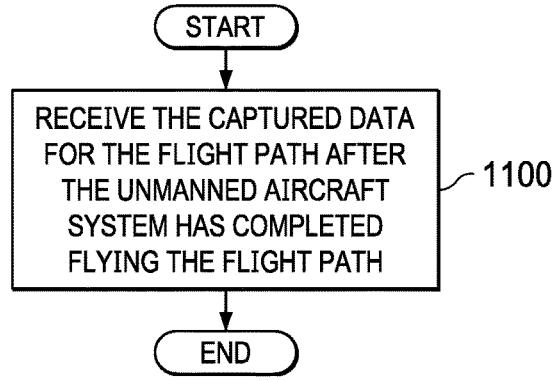
FIG. 11 is an illustration of a flowchart of a process for receiving captured data in accordance with an illustrative example.

With reference next to FIG. 11, an illustration of a flowchart of a process for receiving captured data is depicted in accordance with an illustrative example. The process illustrated in FIG. 11 is an example of one implementation for operation at 900 in FIG. 9.

The process receives the captured data for the flight path after the unmanned aircraft system has complete flying the flight path (operation 1100). The process terminates thereafter. The captured data is for all of the flight path.

Figure 12:
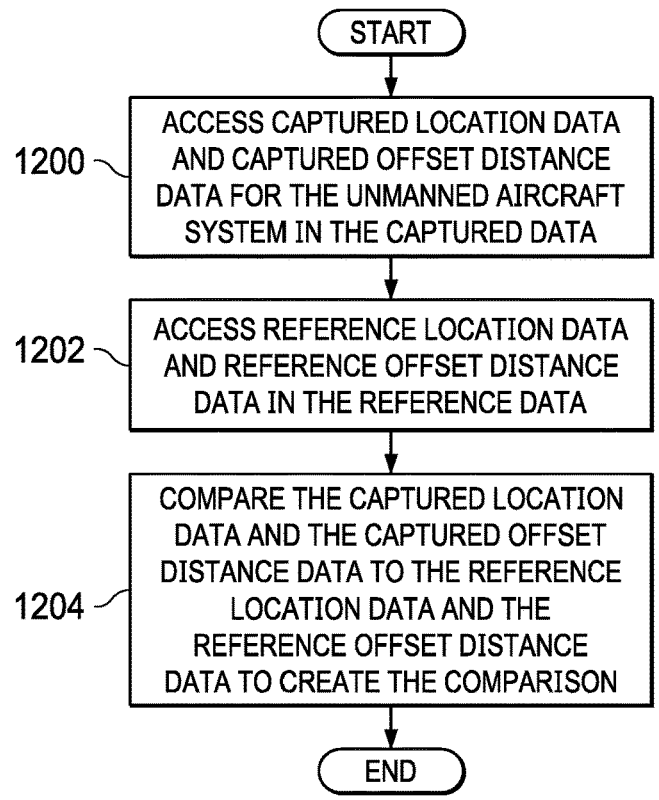
FIG. 12 is an illustration of a flowchart of a process for comparing captured data with reference data in accordance with an illustrative example.

In FIG. 12, an illustration of a flowchart of a process for comparing captured location data with reference location data is depicted in accordance with an illustrative example. The process illustrated in FIG. 12 is an example of one implementation for operation at 902 in FIG. 9.

The process begins by accessing captured location data and captured offset distance data for the unmanned aircraft system in the captured data (operation 1200). The process accesses reference location data and reference offset distance data in the reference data (operation 1202).

The process compares the captured location data and the captured offset distance data to the reference location data and the reference offset distance data to create the comparison (operation 1204). The process terminates thereafter.

Figure 13:
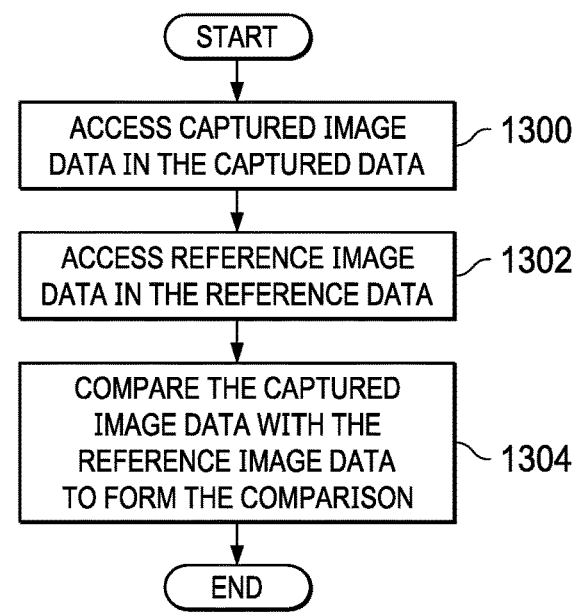
FIG. 13 is an illustration of a flowchart of another process for comparing captured data with reference data in accordance with an illustrative example.

With reference to FIG. 13, an illustration of a flowchart of another process for comparing captured image data with reference image data is depicted in accordance with an illustrative example. The process illustrated in FIG. 13 is another example of one implementation for operation 902 in FIG. 9.

The process begins by accessing captured image data in the captured data (operation 1300). The process accesses reference image data in the reference data (operation 1302).

The process compares the captured image data with the reference image data to form the comparison (operation 1304). The process terminates thereafter.

Figure 14:
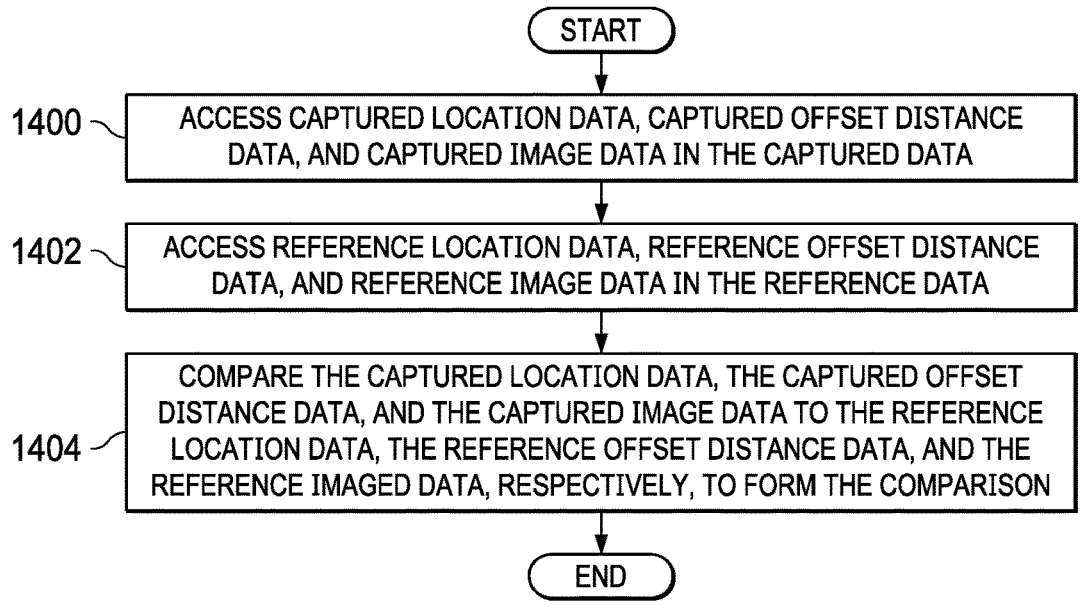
FIG. 14 is an illustration of a flowchart of yet another process for comparing captured data with reference data in accordance with an illustrative example.

With reference to FIG. 14, an illustration of a flowchart of yet another process for comparing captured data with reference data is depicted in accordance with an illustrative example. The process illustrated in FIG. 14 is yet another example of an implementation for operation at 902 in FIG. 9.

The process begins by accessing captured location data, captured offset distance data, and captured image data in the captured data (operation 1400). The process accesses reference location data, reference offset distance data, and reference image data in the reference data (operation 1402).

The process compares the captured location data, the captured offset distance data, and the captured image data to the reference location data, the reference offset distance data, and the reference imaged data, respectively, to form the comparison (operation 1404). The process terminates thereafter.

Figure 15:
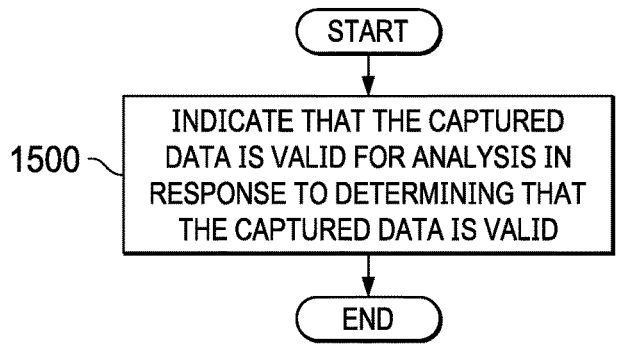
FIG. 15 is an illustration of a flowchart of a process for performing indicating that the captured data is valid for analysis in response to captured data being valid in accordance with an illustrative example.

Turning to FIG. 15, an illustration of a flowchart of a process for indicating that the captured data is valid for analysis in response to captured data being valid is depicted in accordance with an illustrative example. The process in FIG. 15 is an example of an additional operation that can be performed with the operations in FIG. 9.

The process indicates that the captured data is valid for analysis in response to determining that the captured data is valid (operation 1500). The process terminates thereafter. In operation 1500, the process can add an indicator by, for example, setting a flag, adding a certificate, sending a message, or provide some other type of indication that the captured data is valid.

Figure 16:
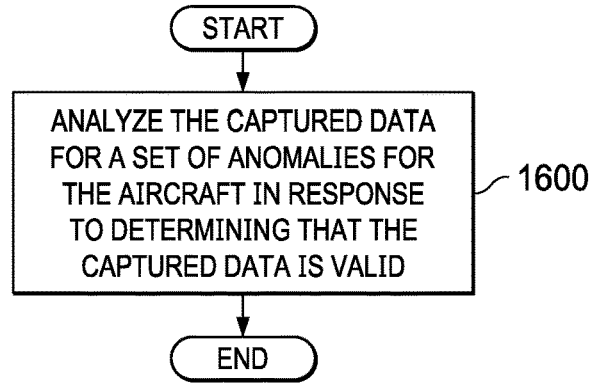
FIG. 16 is an illustration of a flowchart of a process for analyzing the captured data for anomalies in response to captured data being valid in accordance with an illustrative example.

Turning to FIG. 16, an illustration of a flowchart of a process for analyzing the captured data for anomalies in response to captured data being valid is depicted in accordance with an illustrative example. The process in FIG. 16 is an example of an additional operation that can be performed with the operations in FIG. 9 after the capture data is determined to be valid.

The process analyzes the captured data for a set of anomalies for the aircraft in response to determining that the captured data is valid (operation 1600). The process terminates thereafter.

Figure 17:
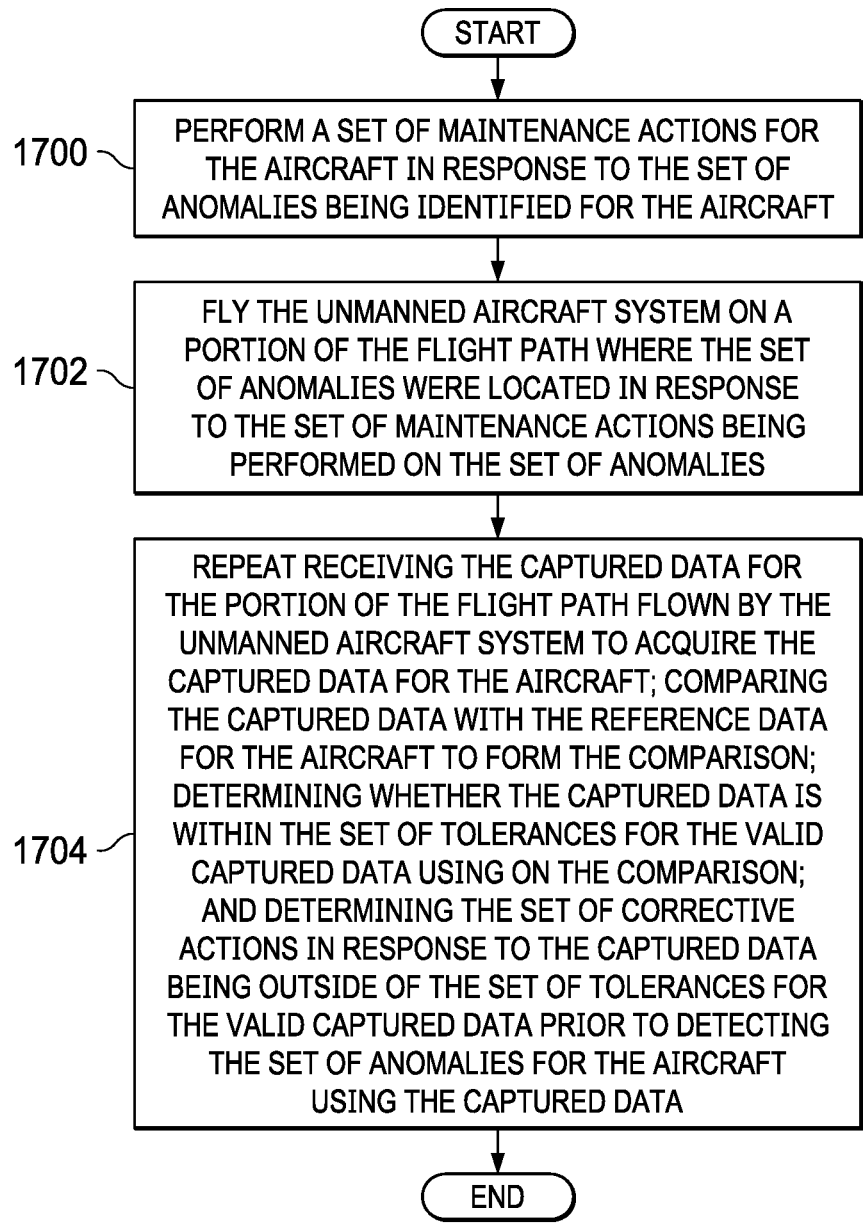
FIG. 17 is an illustration of a flowchart of a process for confirming maintenance performed on an aircraft in accordance with an illustrative example.

Turning to FIG. 17, an illustration of a flowchart of a process for confirming maintenance performed on an aircraft is depicted in accordance with an illustrative example. The process in FIG. 17 is an example of an additional operation that can be performed with the operations in FIG. 9 after maintenance is performed on an aircraft.

A set of maintenance actions is performed for the aircraft in response to the set of anomalies being identified for the aircraft (operation 1700). These maintenance actions can include at least one of an additional inspection, repairing a part, reworking a part, replacing a part, adjust a part, or other suitable interactions.

The process flies the unmanned aircraft system on a portion of the flight path where the set of anomalies were located in response to the set of maintenance actions being performed on the set of anomalies (operation 1702).

The process repeats receiving the captured location data for the portion of the flight path flown by the unmanned aircraft system to acquire the captured image data for the aircraft; comparing the captured data with the reference data for the aircraft to form the comparison; determining whether the captured data is within the set of tolerances for the valid captured data using on the comparison; and determining the set of corrective actions in response to the captured image data being outside of the set of tolerances for the valid captured data prior to detecting the set of anomalies for the aircraft using the image captured data (operation 1704). The process terminates thereafter.

The flowcharts and block diagrams in the different depicted examples illustrate the architecture, functionality, and operation of some possible implementations of apparatuses and methods in an illustrative example. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware can, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative example, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 18:
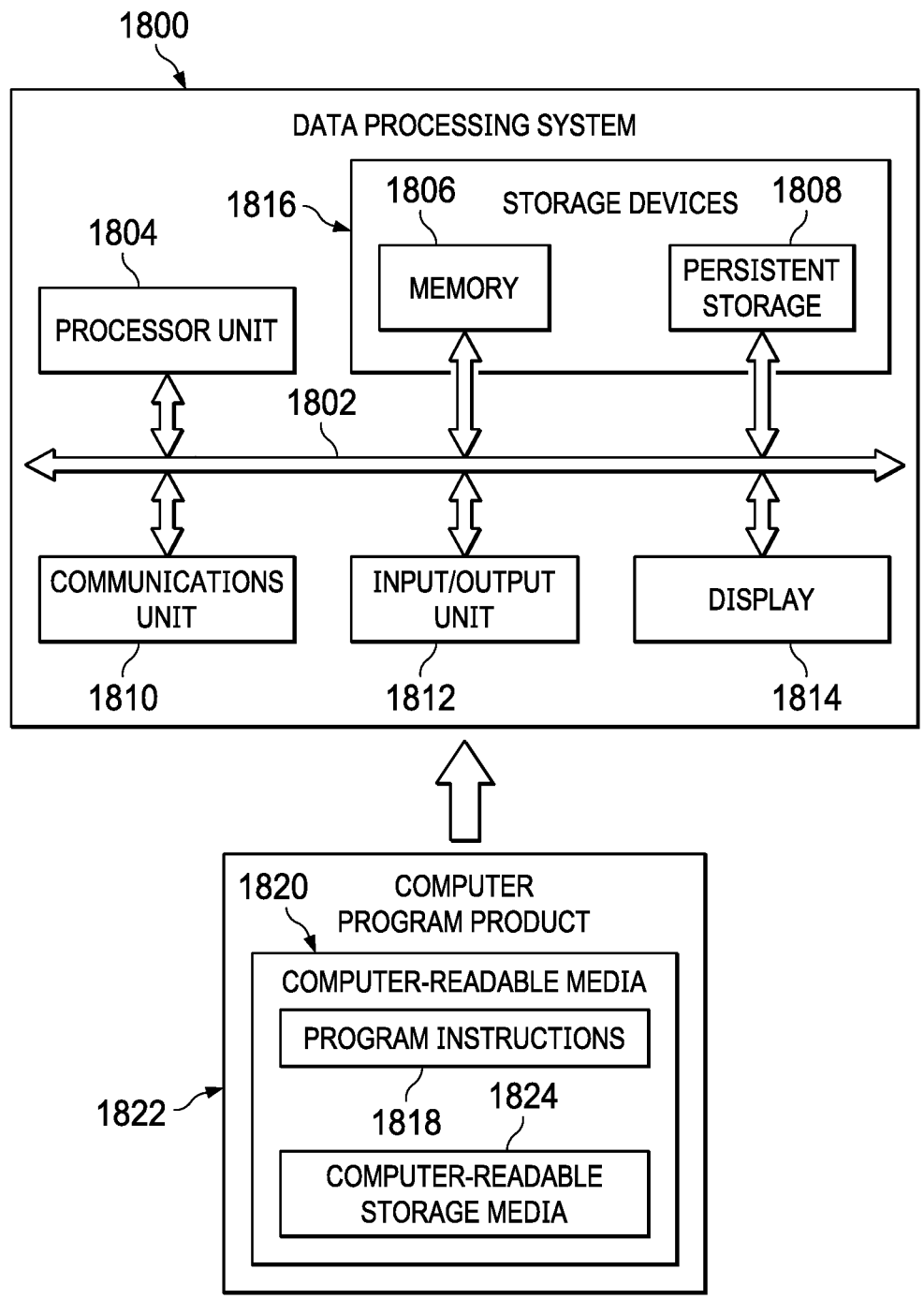
FIG. 18 is an illustration of a block diagram of a data processing system in accordance with an illustrative example.

Turning now to FIG. 18, an illustration of a block diagram of a data processing system is depicted in accordance with an illustrative example. Data processing system 1800 can be used to implement computer 120 in FIG. 1 and computer system 206 in FIG. 2. In this illustrative example, data processing system 1800 includes communications framework 1802, which provides communications between processor unit 1804, memory 1806, persistent storage 1808, communications unit 1810, input/output (I/O) unit 1812, and display 1814. In this example, communications framework 1802 takes the form of a bus system.

Processor unit 1804 serves to execute instructions for software that can be loaded into memory 1806. Processor unit 1804 includes one or more processors. For example, processor unit 1804 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1804 can may be implemented using one or more heterogeneous processor systems in which a main processor is present with secondary processors on a single chip. As another illustrative example, processor unit 1804 can be a symmetric multi-processor system containing multiple processors of the same type on a single chip.

Memory 1806 and persistent storage 1808 are examples of storage devices 1816. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1816 may also be referred to as computer-readable storage devices in these illustrative examples. Memory 1806, in these examples, can be, for example, a random-access memory or any other suitable volatile or non-volatile storage device. Persistent storage 1808 can take various forms, depending on the particular implementation.

For example, persistent storage 1808 may contain one or more components or devices. For example, persistent storage 1808 can be a hard drive, a solid-state drive (SSD), a flash memory, a rewritable optical disk, a rewritable magnetic tape, or some combination of the above. The media used by persistent storage 1808 also can be removable. For example, a removable hard drive can be used for persistent storage 1808.

Communications unit 1810, in these illustrative examples, provides for communications with other data processing systems or devices. In these illustrative examples, communications unit 1810 is a network interface card.

Input/output unit 1812 allows for input and output of data with other devices that can be connected to data processing system 1800. For example, input/output unit 1812 can provide a connection for user input through at least one of a keyboard, a mouse, or some other suitable input device. Further, input/output unit 1812 can send output to a printer. Display 1814 provides a mechanism to display information to a user.

Instructions for at least one of the operating system, applications, or programs can be located in storage devices 1816, which are in communication with processor unit 1804 through communications framework 1802. The processes in the different examples can be performed by processor unit 1804 using computer-implemented instructions, which can be located in a memory, such as memory 1806.

These instructions are program instructions and are also referred to as program code, computer usable program code, or computer-readable program code that can be read and executed by a processor in processor unit 1804. The program code in the different examples can be embodied on different physical or computer-readable storage media, such as memory 1806 or persistent storage 1808.

Program code 1818 is located in a functional form on computer-readable media 1820 that is selectively removable and can be loaded onto or transferred to data processing system 1800 for execution by processor unit 1804. Program code 1818 and computer-readable media 1820 form computer program product 1822 in these illustrative examples. In the illustrative example, computer-readable media 1820 is computer-readable storage media 1824.

Computer-readable storage media 1824 is a physical or tangible storage device used to store program code 1818 rather than a media that propagates or transmits program code 1818. Computer-readable storage media 1824, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 1818 can be transferred to data processing system 1800 using a computer-readable signal media. The computer-readable signal media are signals and can be, for example, a propagated data signal containing program code 1818. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 1820" can be singular or plural. For example, program code 1818 can be located in computer-readable media 1820 in the form of a single storage device or system. In another example, program code 1818 can be located in computer-readable media 1820 that is distributed in multiple data processing systems. In other words, some instructions in program code 1818 can be located in one data processing system while other instructions in program code 1818 can be located in one data processing system. For example, a portion of program code 1818 can be located in computer-readable media 1820 in a server computer while another portion of program code 1818 can be located in computer-readable media 1820 located in a set of client computers.

The different components illustrated for data processing system 1800 are not meant to provide architectural limitations to the manner in which different examples can be implemented. In some illustrative examples, one or more of the components may be incorporated in or otherwise form a portion of, another component. For example, memory 1806, or portions thereof, can be incorporated in processor unit 1804 in some illustrative examples. The different illustrative examples can be implemented in a data processing system including components in addition to or in place of those illustrated for data processing system 1800. Other components shown in FIG. 18 can be varied from the illustrative examples shown. The different examples can be implemented using any hardware device or system capable of running program code 1818.

Figure 19:
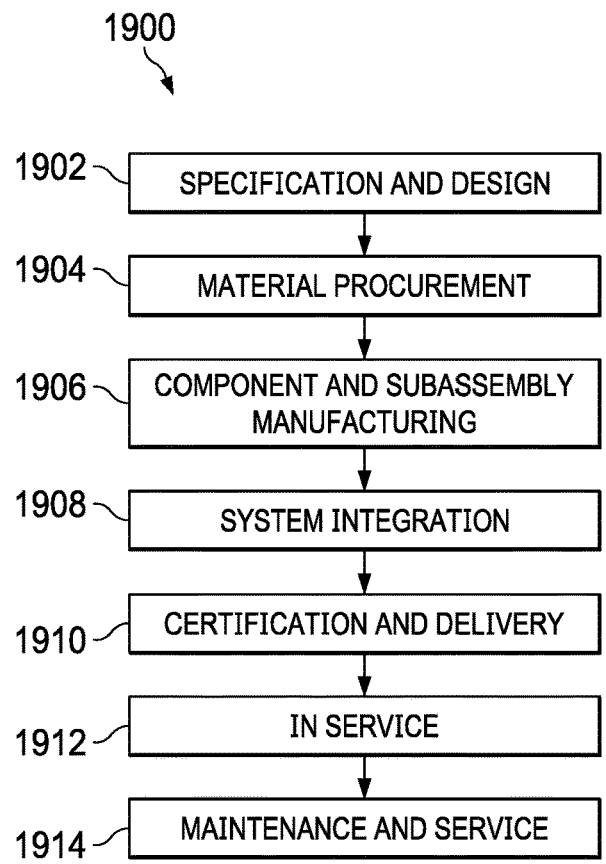
FIG. 19 is an illustration of an aircraft manufacturing and service method in accordance with an illustrative example.
Figure 20:
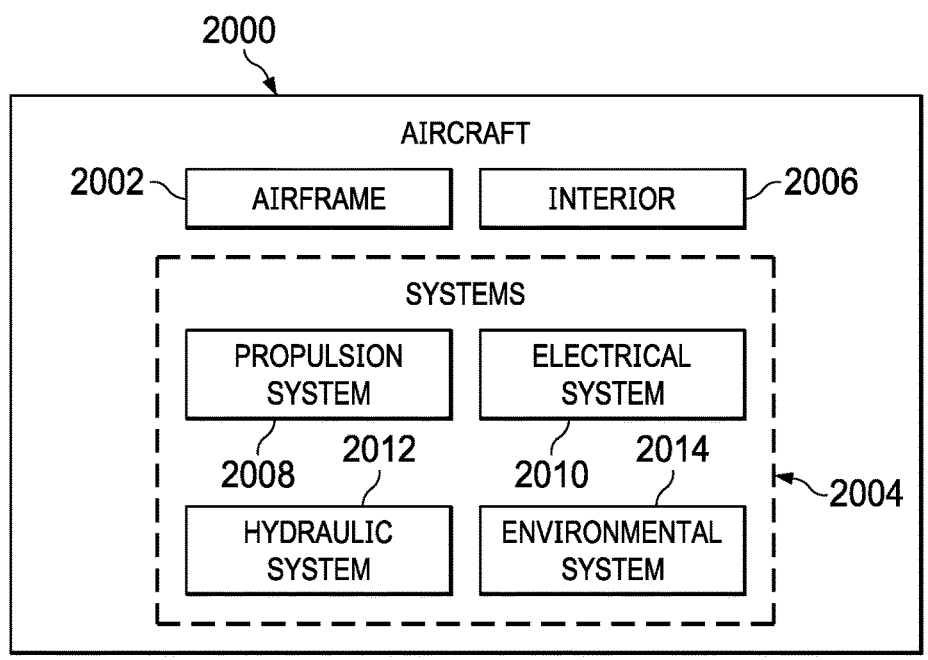
FIG. 20 is an illustration of a block diagram of an aircraft in which an illustrative example may be implemented.

Illustrative examples of the disclosure may be described in the context of aircraft manufacturing and service method 1900 as shown in FIG. 19 and aircraft 2000 as shown in FIG. 20. Turning first to FIG. 19, an illustration of an aircraft manufacturing and service method is depicted in accordance with an illustrative example. During pre-production, aircraft manufacturing and service method 1900 may include specification and design 1902 of aircraft 2000 in FIG. 20 and material procurement 1904.

During production, component and subassembly manufacturing 1906 and system integration 1908 of aircraft 2000 in FIG. 20 takes place. Thereafter, aircraft 2000 in FIG. 20 can go through certification and delivery 1910 in order to be placed in service 1912. While in service 1912 by a customer, aircraft 2000 in FIG. 20 is scheduled for routine maintenance and service 1914, which may include modification, reconfiguration, refurbishment, and other maintenance or service.

Each of the processes of aircraft manufacturing and service method 1900 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 20, an illustration of an aircraft is depicted in which an illustrative example may be implemented. In this example, aircraft 2000 is produced by aircraft manufacturing and service method 1900 in FIG. 19 and may include airframe 2002 with plurality of systems 2004 and interior 2006. Examples of systems 2004 include one or more of propulsion system 2008, electrical system 2010, hydraulic system 2012, and environmental system 2014. Any number of other systems may be included. Although an aerospace example is shown, different illustrative examples may be applied to other industries, such as the automotive industry.

Apparatuses and methods embodied herein may be employed during at least one of the stages of aircraft manufacturing and service method 1900 in FIG. 19.

In one illustrative example, components or subassemblies produced in component and subassembly manufacturing 1906 in FIG. 19 can be fabricated or manufactured in a manner similar to components or subassemblies produced while aircraft 2000 is in service 1912 in FIG. 19. As yet another example, one or more apparatus examples, method examples, or a combination thereof can be utilized during production stages, such as component and subassembly manufacturing 1906 and system integration 1908 in FIG. 19. One or more apparatus examples, method examples, or a combination thereof may be utilized while aircraft 2000 is in service 1912, during maintenance and service 1914 in FIG. 19, or both. The use of a number of the different illustrative examples may substantially expedite the assembly of aircraft 2000, reduce the cost of aircraft 2000, or both expedite the assembly of aircraft 2000 and reduce the cost of aircraft 2000.

For example, aircraft inspection system 202 can be used to perform inspections of aircraft 2000 during maintenance and service 1914. These inspections can be performed in a manner that generates validated inspection data that can be used to schedule maintenance. The inspection data can also be used to satisfy regulatory requirements for inspections. Further, aircraft inspection system 202 can use during manufacturing of aircraft 2000 such as during of system integration 1908 and certification and delivery 1910.

Figure 21:
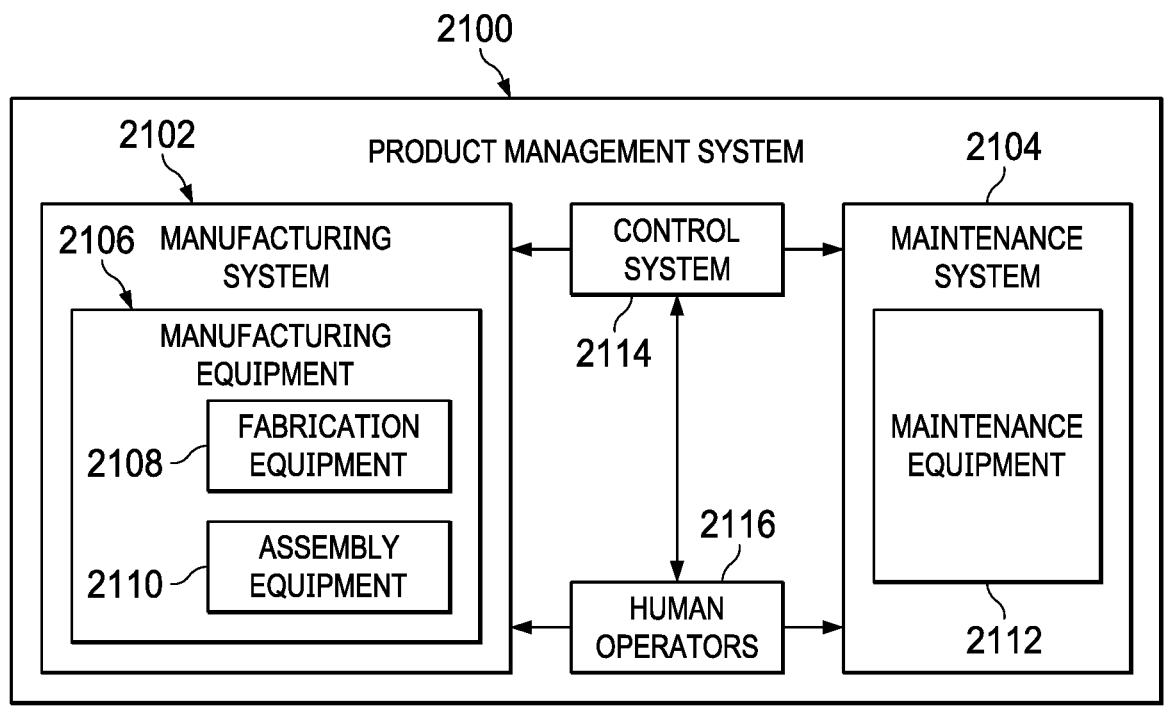
FIG. 21 is an illustration of a block diagram of a product management system is depicted in accordance with an illustrative example.

Turning now to FIG. 21, an illustration of a block diagram of a product management system is depicted in accordance with an illustrative example. Product management system 2100 is a physical hardware system. In this illustrative example, product management system 2100 includes at least one of manufacturing system 2102 or maintenance system 2104.

Manufacturing system 2102 is configured to manufacture products, such as aircraft 2000 in FIG. 20. As depicted, manufacturing system 2102 includes manufacturing equipment 2106. Manufacturing equipment 2106 includes at least one of fabrication equipment 2108 or assembly equipment 2110.

Fabrication equipment 2108 is equipment that used to fabricate components for parts used to form aircraft 2000 in FIG. 20. For example, fabrication equipment 2108 can include machines and tools. These machines and tools can be at least one of a drill, a hydraulic press, a furnace, an autoclave, a mold, a composite tape laying machine, an automated fiber placement (AFP) machine, a vacuum system, a robotic pick and place system, a flatbed cutting machine, a laser cutter, a computer numerical control (CNC) cutting machine, a lathe, or other suitable types of equipment. Fabrication equipment 2108 can be used to fabricate at least one of metal parts, composite parts, semiconductors, circuits, fasteners, ribs, skin panels, spars, antennas, or other suitable types of parts.

Assembly equipment 2110 is equipment used to assemble parts to form aircraft 2000 in FIG. 20. In particular, assembly equipment 2110 is used to assemble components and parts to form aircraft 2000 in FIG. 20. Assembly equipment 2110 also can include machines and tools. These machines and tools may be at least one of a robotic arm, a crawler, a faster installation system, a rail-based drilling system, an unmanned aircraft system, or a robot. Assembly equipment 2110 can be used to assemble parts such as seats, horizontal stabilizers, wings, engines, engine housings, landing gear systems, and other parts for aircraft 2000 in FIG. 20.

In this illustrative example, maintenance system 2104 includes maintenance equipment 2112. Maintenance equipment 2112 can include any equipment needed to perform maintenance on aircraft 2000 in FIG. 20. Maintenance equipment 2112 may include tools for performing different operations on parts on aircraft 2000 in FIG. 20. These operations can include at least one of disassembling parts, refurbishing parts, inspecting parts, reworking parts, manufacturing replacement parts, or other operations for performing maintenance on aircraft 2000 in FIG. 20. These operations can be for routine maintenance, inspections, upgrades, refurbishment, or other types of maintenance operations.

In the illustrative example, maintenance equipment 2112 may include ultrasonic inspection devices, x-ray imaging systems, vision systems, drills, crawlers, unmanned aircraft systems, and other suitable devices. In some cases, maintenance equipment 2112 can include fabrication equipment 2108, assembly equipment 2110, or both to produce and assemble parts that needed for maintenance.

Product management system 2100 also includes control system 2114. Control system 2114 is a hardware system and may also include software or other types of components. Control system 2114 is configured to control the operation of at least one of manufacturing system 2102 or maintenance system 2104. In particular, control system 2114 can control the operation of at least one of fabrication equipment 2108, assembly equipment 2110, or maintenance equipment 2112.

The hardware in control system 2114 can be implemented using hardware that may include computers, circuits, networks, and other types of equipment. The control may take the form of direct control of manufacturing equipment 2106. For example, robots, computer-controlled machines, and other equipment can be controlled by control system 2114. In other illustrative examples, control system 2114 can manage operations performed by human operators 2116 in manufacturing or performing maintenance on aircraft 2000. For example, control system 2114 can assign tasks, provide instructions, display models, or perform other operations to manage operations performed by human operators 2116. In these illustrative examples, controller 208 in FIG. 2 can be implemented in control system 2114 to manage at least one of the manufacturing or maintenance of aircraft 2000 in FIG. 20. For example, controller 208 can be implemented in control system 2114 control an unmanned aircraft system in maintenance equipment 2112 to perform inspections of an aircraft. As another example, controller 208 can control an unmanned aircraft system in manufacturing equipment 2106 to perform inspections of aircraft being manufactured by manufacturing system 2102.

In the different illustrative examples, human operators 2116 can operate or interact with at least one of manufacturing equipment 2106, maintenance equipment 2112, or control system 2114. This interaction can occur to manufacture aircraft 2000 in FIG. 20.

Of course, product management system 2100 may be configured to manage other products other than aircraft 2000 in FIG. 20. Although product management system 2100 has been described with respect to manufacturing in the aerospace industry, product management system 2100 can be configured to manage products for other industries. For example, product management system 2100 can be configured to manufacture products for the automotive industry as well as any other suitable industries.

Some features of the illustrative examples are described in the following clauses. These clauses are examples of features not intended to limit other illustrative examples.

Clause 1
A method for inspecting an aircraft comprising:
receiving, by a computer system, captured data associated with a flight path that is flown by an unmanned aircraft system to acquire the captured data for the aircraft;
comparing, by the computer system, the captured data with reference data for the aircraft to form a comparison;
determining, by the computer system, whether the captured data is within a set of tolerances for valid captured data using a result of the comparison; and
prior to detecting anomalies for the aircraft using the captured data. determining, by the computer system, a set of corrective actions in response to the captured data being outside of the set of tolerances for the valid captured data in which the set of corrective actions is performed.

Clause 2
The method according to clause 1 further comprising:
performing, by the computer system, the set of corrective actions using at least one of the unmanned aircraft system or another unmanned aircraft system.

Clause 3
The method according to one of clauses 1 or 2, wherein receiving, by the computer system, the captured data for the flight path comprises:
receiving, by the computer system, the captured data for the flight path while the unmanned aircraft system is flying the flight path, wherein the captured data is for a portion of the flight path flown by the unmanned aircraft system.

Clause 4
The method according to one of clauses 1, 2, or 3, wherein receiving, by the computer system, the captured data for the flight path comprises:
receiving, by the computer system, the captured data for the flight path in response to the unmanned aircraft system completing flying the flight path, wherein the captured data is for all of the flight path.

Clause 5
The method according to one of clauses 1, 2, 3, or 4, wherein comparing the captured data comprises:
accessing, by the computer system, captured location data and captured offset distance data for the unmanned aircraft system in the captured data;
accessing, by the computer system, reference location data and reference offset distance data in the reference data; and
comparing, by the computer system, the captured location data and the captured offset distance data to the reference location data and the reference offset distance data, respectively, to create the comparison.

Clause 6
The method according to clause 5 further comprising:
creating, by the computer system, the reference location data and the reference offset distance data using at least one of a computer aided design model of the aircraft, point cloud scans, or historical flight paths from one or more prior inspections of the aircraft.

Clause 7
The method according to one of clauses 1, 2, 3, 4, 5, or 6, wherein comparing the captured data with the reference data comprises:
accessing, by the computer system, captured image data in the captured data;
accessing, by the computer system, reference image data in the reference data; and comparing, by the computer system, the captured image data with the reference image data to form the comparison.

Clause 8

The method according to clause 7 further comprising:
creating, by the computer system, the reference image data using at least one of a computer aided design model of the aircraft, a point cloud scan of the aircraft, or historical images of the aircraft.

Clause 9

The method according to one of clauses 1, 2, 3, 4, 5, 6, 7, or 8, wherein comparing, by the computer system, the captured data comprises:
accessing, by the computer system, captured location data, captured offset distance data, and captured image data in the captured data;
accessing, by the computer system, reference location data, reference offset distance data, and reference image data in the reference data; and
comparing, by the computer system, the captured location data, the captured offset distance data, and the captured image data to the reference location data, the reference offset distance data, and the reference imaged data, respectively, to form the comparison.

Clause 10

The method according to one of clauses 1, 2, 3, 4, 5, 6, 7, 8, or 9 further comprising:
indicating, by the computer system, that the captured data is valid for analysis in response to determining that the captured data is valid.

Clause 11

The method according to one of clauses 1, 2, 3, 4, 5, 6, 7, 8, 9, or 10 further comprising:
analyzing, by the computer system, the captured data for a set of anomalies for the aircraft in response to determining that the captured data is valid.

Clause 12

The method according to clause 11, wherein a set of maintenance actions for the aircraft are performed in response to the set of anomalies being identified for the aircraft.

Clause 13

The method of claim 12 further comprising:
flying the unmanned aircraft system on a portion of the flight path where the set of anomalies were located in response to the set of maintenance actions being performed on the set of anomalies; and
repeating, by the computer system, receiving the captured data for the portion of the flight path flown by the unmanned aircraft system to acquire the captured data for the aircraft;
comparing the captured data with the reference data for the aircraft to form the comparison;
determining whether the captured data is within the set of tolerances for the valid captured data using on the comparison; and
determining the set of corrective actions in response to the captured data being outside of the set of tolerances for the valid captured data prior to detecting the set of anomalies for the aircraft using the captured data.

Clause 14

The method according to one of clauses 1, 2, 3, 4, 5, 6, 7, 8, 9, 10, 11, 12, or 13, wherein the set of corrective actions comprises is selected from at least one of repeating capturing data for the flight path, repeating image generation for a portion of the flight path on which captured data is not valid, repeating capturing data using an adjusted flight path, or adjusting settings of a camera system on the unmanned aircraft system.

Clause 15

The method according to one of clauses 1, 2, 3, 4, 5, 6, 7, 8, 9, 10, 11, 12, 13, or 14, wherein an automated analysis tool performs at least one of comparing the captured data with the reference data for the aircraft to form the comparison; determining whether the captured data is within the set of tolerances for the valid captured data using the comparison; or determining the set of corrective actions in response to the captured data being outside of the set of tolerances for the valid captured data.

Clause 16

The method according to one of clauses 1, 2, 3, 4, 5, 6, 7, 8, 9, 10, 11, 12, 13, 14, or 15, wherein the aircraft is one of a commercial aircraft, a commercial passenger airplane, a rotorcraft, a tilt-rotor aircraft, a tilt wing aircraft, a vertical takeoff and landing aircraft, an electrical vertical takeoff and landing vehicle, and a partially manufactured aircraft.

Clause 17

An aircraft inspection system comprising:
a computer system; and
a controller in the computer system wherein the controller is configured to:
receive captured data associated with a flight path that is flown by an unmanned aircraft system to acquire the captured data for an aircraft;
compare the captured data with reference data for the aircraft to form a comparison;
determine whether the captured data is within a set of tolerances for valid captured data using a result of the comparison; and
prior to detecting anomalies for the aircraft using the captured data, determine a set of corrective actions in response to the captured data being outside the set of tolerances for the valid captured data in which the set of corrective actions is performed.

Clause 18

The aircraft inspection system according to clause 17, wherein the controller is configured to:
perform, by the computer system, the set of corrective actions using at least one of the unmanned aircraft system or another unmanned aircraft system.

Clause 19

The aircraft inspection system according to one of clauses 17 or 18, wherein in receiving the captured data for the flight path, the controller is configured to:
receive the captured data for the flight path while the unmanned aircraft system is flying the flight path, wherein the captured data is for a portion of the flight path flown by the unmanned aircraft system.

Clause 20

The aircraft inspection system according to one of clauses 17, 18, or 19, wherein in receiving the captured data for the flight path, is configured to:
receive the captured data for the flight path in response to the unmanned aircraft system completing flying the flight path, wherein the captured data is for all of the flight path.

Clause 21

The aircraft inspection system according to one of clauses 17, 18, 19, or 20, wherein comparing the captured data to the reference data, the controller is configured to:
access captured location data and captured offset distance data for the unmanned aircraft system in the captured data;

access reference location data and reference offset distance data in the reference data; and
compare the captured location data and the captured offset distance data to the reference location data and the reference offset distance data to create the comparison.

Clause 22

The aircraft inspection system according to one of clauses 17, 18, 19, 20, or 21, wherein the controller is configured to:
create the reference location data and the reference offset distance data using at least one of a computer aided design model of the aircraft, point cloud scan of the aircraft, or historical flight paths from one or more prior inspections of the aircraft.

Clause 23

The aircraft inspection system according to one of clauses 17, 18, 19, 20, or 21, wherein in comparing the captured data with the reference data, the controller is configured to:
access captured image data in the captured data;
access reference image data in the reference data; and
compare the captured image data with the reference image data to form the comparison.

Clause 24

The aircraft inspection system according to clause 23, wherein the controller is configured to:
create the reference image data using at least one of a computer aided design model of the aircraft, a point cloud scan, or historical images of the aircraft.

Clause 25

The aircraft inspection system according to one of clauses 17, 18, 19, 20, 21, 22, 23, or 24, wherein in comparing the captured data to the references, wherein the controller is configured to:
access captured location data, captured offset distance data, and captured image data in the captured data;
access reference location data, reference offset distance data, and reference image data in the reference data; and
compare the captured location data, the captured offset distance data, and the captured image data to the reference location data, the reference offset distance data, and the reference imaged data, respectively, to form the comparison.

Clause 26

The aircraft inspection system according to one of clauses 17, 18, 19, 20, 21, 22, 23, 24, or 25, wherein the controller is configured to:
indicate that the captured data is valid for analysis in response to determining that the captured data is valid.

Clause 27

The aircraft inspection system according to one of clauses 17, 18, 19, 20, 21, 22, 23, 24, 25, or 26, wherein the captured data is analyzed for a set of anomalies for the aircraft in response to determining that the captured data is valid.

Clause 28

The aircraft inspection system according to clause 27, wherein a set of maintenance actions is performed for the aircraft in response to the set of anomalies being identified for the aircraft.

Clause 29

The aircraft inspection system according to clause 28, wherein the controller is configured to:
fly the unmanned aircraft system on a portion of the flight path where the set of anomalies were located in response to the set of maintenance actions being performed on the set of anomalies; and
repeat receiving the captured data for the portion of the flight path flown by the unmanned aircraft system to acquire the captured data for the aircraft; comparing the captured data with the reference data for the aircraft to form the comparison; determining whether the captured data is within the set of tolerances for the valid captured data using on the comparison; and determining the set of corrective actions in response to the captured data being outside of the set of tolerances for the valid captured data prior to detecting the set of anomalies for the aircraft using the captured data.

Clause 30

The aircraft inspection system according to one of clauses 17, 18, 19, 20, 21, 22, 23, 24, 25, 26, 27, 28, or 29, wherein the set of corrective actions comprises is selected from at least one of repeating capturing data for the flight path, repeating image generation for a portion of the flight path on which invalid captured data is present, repeating capturing data using an adjusted flight path, or adjusting settings of a camera system on the unmanned aircraft system.

Clause 31

The aircraft inspection system according to one of clauses 17, 18, 19, 20, 21, 22, 23, 24, 25, 26, 27, 28, 29, or 30, wherein an automated analysis tool performs at least one of comparing the captured data with the reference data for the aircraft to form the comparison; determining whether the captured data is within the set of tolerances for the valid captured data using the comparison; or determining the set of corrective actions in response to the captured data being outside of the set of tolerances for the valid captured data.

Clause 32

The aircraft inspection system according to one of clauses 17, 18, 19, 20, 21, 22, 23, 24, 25, 26, 27, 28, 29, 30, or 31, wherein the aircraft is one of a commercial aircraft, a rotorcraft, a tilt-rotor aircraft, a tilt wing aircraft, a vertical takeoff and landing aircraft, an electrical vertical takeoff and landing vehicle, and a partially manufactured aircraft.

Clause 33

A computer program product for inspecting an aircraft, the computer program product comprising a computer readable storage media having program instructions embodied therewith, the program instructions executable by a computer system to cause the computer system to perform a method of:
receiving captured data associated with a flight path that is flown by an unmanned aircraft system to acquire the captured data for the aircraft;
comparing the captured data with reference data for the aircraft to form a comparison;
determining whether the captured data is within a set of tolerances for valid captured data using a result of the comparison; and
determining a set of corrective actions in response to the captured data being outside the set of tolerances for the valid captured data in which the set of corrective actions is performed prior to detecting anomalies for the aircraft using the captured data.

Thus, illustrative examples provide a method, apparatus, system, and computer program product for inspecting aircraft. In one illustrative example, a computer system, receives captured locations and image data for a flight path flown by an unmanned aircraft system to acquire the captured data for the aircraft. The computer system compares the captured data with reference data for the aircraft to form a comparison. The computer system determines whether the captured data is within a set of tolerances for valid captured data using the comparison. The computer system determines a set of corrective actions in response to the captured data being outside of the set of tolerances for the valid captured data in which the set of corrective actions is performed prior to detecting anomalies for the aircraft using the captured data.

Thus, an automated inspection system in the illustrative examples can operate to validate captured data such as flight paths and captured image data to determine whether this data can be used for determining whether anomalies are present on aircraft. Further, this validation can also be performed to meet regulatory requirements or manufacturer requirements or performing inspections.

The description of the different illustrative examples has been presented for purposes of illustration and description and is not intended to be exhaustive or limited to the examples in the form disclosed. The different illustrative examples describe components that perform actions or operations. In an illustrative example, a component can be configured to perform the action or operation described. For example, the component can have a configuration or design for a structure that provides the component an ability to perform the action or operation that is described in the illustrative examples as being performed by the component. Further, To the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative examples may provide different features as compared to other desirable examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A method for inspecting an object, the method comprising:
   generating, by a computer system using a relative coordinate system defined using an origin that is relative to a point or location on or in the object, for a first inspection vehicle, reference data defined using the relative coordinate system and comprising: a reference velocity in an x direction, a reference velocity in a y direction, a reference yaw angle, a reference pitch angle, and a reference distance from the object, respectively, at a first location and at a second location, wherein the first inspection vehicle comprises a sensor system;
   the first inspection vehicle generating captured image data and moving from the first location to the second location;
   receiving, by the computer system for the first inspection vehicle at the first location, captured data comprising: a velocity in an x direction, a velocity in a y direction, a yaw angle, a pitch angle, and a distance from the object defined in an absolute coordinate system;
   aligning the captured data from the absolute coordinate system into the relative coordinate system referenced to the object;
   forming a comparison, by the computer system, for the first inspection vehicle at the first location: the velocity in an x direction, the velocity in a y direction, the yaw angle, the pitch angle, and the distance from the object, to: the reference velocity in an x direction, the reference velocity in a y direction, the reference yaw angle, the reference pitch angle, and the reference distance from the object, for the first inspection vehicle at the first location;
   determining, by the computer system using the comparison, whether the velocity in an x direction, the velocity in a y direction, the yaw angle, the pitch angle, and the distance from the object, at the first location are within a set of tolerances and thereby valid or outside the set of tolerances and thereby invalid;
   responsive to: the velocity in an x direction, the velocity in a y direction, the yaw angle, the pitch angle, and the distance from the object, at the first location being invalid, and prior to detecting anomalies for the object, determining, by the computer system, a set of corrective actions; and
   performing, prior to detecting, from the captured image data, anomalies for the object, the set of corrective actions using at least one of the first inspection vehicle or a second inspection vehicle.

2. The method of claim 1 further comprising:
   the computer system indicating that the captured data is valid for analysis in response to determining that the captured data is valid.

3. The method of claim 1, further comprising:
   generating, for the first inspection vehicle: a reference velocity in an z direction, and a reference roll angle at a first location and at a second location;
   transporting the first inspection vehicle to the first location; and
   receiving, by the computer system, for the first inspection vehicle at the first location: a velocity in an z direction, and a roll angle.

4. The method of claim 1, further comprising:
   receiving, by the computer system, for the first inspection vehicle at the second location: a second velocity in an x direction, a second velocity in a y direction, a second yaw angle, a second pitch angle, and a second distance from the object;
   forming a second comparison, by the computer system, for the first inspection vehicle at the second location: the second velocity in an x direction, the second velocity in a y direction, the second yaw angle, the second pitch angle, and the second distance from the object, to: a second reference velocity in an x direction, a second reference velocity in a y direction, a second reference yaw angle, a second reference pitch angle, and a second reference distance from the object, for the first inspection vehicle at the second location; and
   determining, by the computer system using the comparison, whether the second velocity in an x direction, the second velocity in a y direction, the second yaw angle, the second pitch angle, and the second distance from the object, at the second location are within a second set of tolerances and thereby valid or outside the second set of tolerances and thereby invalid.

5. The method of claim 4, further comprising:
   responsive the second velocity in an x direction, the second velocity in a y direction, the second yaw angle, the second pitch angle, and the second distance from the object, at the second location being invalid and prior to detecting anomalies for the object, determining, by the computer system, a set of second corrective actions; and
   performing, by the computer system, the set of second corrective actions using at least one of the first inspection vehicle or the second inspection vehicle.

6. The method of claim 5, further comprising the computer system using at least one of: a computer aided design model of the object, point cloud scans, or historical paths from one or more prior inspections of the object.

7. The method of claim 1, further comprising:
capturing, with a sensor on the first inspection vehicle, captured image data;
accessing, by the computer system, the captured image data;
accessing, by the computer system, reference image data; and
comparing, by the computer system, the captured image data with the reference image data to form an image comparison.

8. The method of claim 7 further comprising:
creating, by the computer system, the reference image data using at least one of: a computer aided design model of the object, a point cloud scan of the object, or historical images of the object.

9. The method of claim 1, further comprising:
the computer system determining a reference pixel density and reference coordinates for a feature position for an image captured by the first inspection vehicle at the first location;
the first inspection vehicle generating a captured image at the first location;
the computer system receiving the captured image; and
comparing, by the computer system, a captured pixel density and captured coordinates for the feature position in the captured image to the reference pixel density and reference coordinates for the feature position and forming an image comparison.

10. The method of claim 9 further comprising:
determining, by the computer system using the image comparison, whether the captured pixel density and captured coordinates for the feature position are within a third set of tolerances and thereby valid or outside the third set of tolerances and thereby invalid.

11. The method of claim 10 further comprising:
analyzing, by the computer system in response to determining that the captured pixel density and captured coordinates for the feature position are valid, the captured pixel density and captured coordinates for the feature position for a set of anomalies for the object valid.

12. The method of claim 11, wherein a set of maintenance actions for the object are performed in response to the set of anomalies being identified for the object.

13. The method of claim 1 further comprising:
the first inspection vehicle being an unmanned aircraft; and
determining, by the computer system, a set of corrective actions in response to the velocity in an x direction, the velocity in a y direction, the yaw angle, the pitch angle, and the distance from the object being outside of the set of tolerances.

14. The method of claim 1, wherein the set of corrective actions is selected from at least one of transporting a second inspection vehicle to the first location and to the second location, or adjusting settings of the sensor system on the first inspection vehicle.

15. An inspection system that comprises:
a first inspection vehicle;
a computer system; and
a controller in the computer system wherein the controller is configured to:
generate, for the first inspection vehicle, reference data, based upon a relative coordinate system defined based upon an origin that is relative to a point or location on or in an object, that comprises: a reference velocity in an x direction, a reference velocity in a y direction, a reference yaw angle, a reference pitch angle, and a reference distance from an object, respectively, at a first location and at a second location, wherein the first inspection vehicle comprises a sensor system;
direct moving the first inspection vehicle to the first location and to the second location;
receive, for the first inspection vehicle at the first location, captured data that comprises: a velocity in an x direction, a velocity in a y direction, a yaw angle, a pitch angle, and a distance from the object, defined in an absolute coordinate system;
align the captured data from the absolute coordinate system into the relative coordinate system referenced to the object;
form a comparison, for the first inspection vehicle at the first location, of: the velocity in an x direction, the velocity in a y direction, the yaw angle, the pitch angle, and the distance from the object, to: the reference velocity in an x direction, the reference velocity in a y direction, the reference yaw angle, the reference pitch angle, and the reference distance from the object, for the first inspection vehicle at the first location;
determine, by the computer system using the comparison, whether the velocity in an x direction, the velocity in a y direction, the yaw angle, the pitch angle, and the distance from the object, at the first location are within a set of tolerances and thereby valid or outside the set of tolerances and thereby invalid;
responsive the velocity in an x direction, the velocity in a y direction, the yaw angle, the pitch angle, and the distance from the object, at the first location being invalid and prior to a detection of anomalies for the object determine, by the computer system, a set of corrective actions; and
perform, prior to a detection of anomalies for the object, the set of corrective actions using at least one of the first inspection vehicle or a second inspection vehicle.

16. The inspection system of claim 15, wherein the first inspection vehicle is an unmanned aircraft system.

17. The inspection system of claim 15, wherein the computer system is configured to receive the velocity in an x direction, the velocity in a y direction, the yaw angle, the pitch angle, and the distance from the object after the first inspection vehicle is at the second location.

18. The inspection system of claim 15, wherein the controller is
further configured to:
generate, for the first inspection vehicle: a reference velocity in an z direction, and a reference roll angle at a first location and at a second location; transport the first inspection vehicle to the first location; and
receive, by the computer system, for the first inspection vehicle at the first location: a velocity in an z direction, and a roll angle.

19. The inspection system of claim 15, wherein the controller is further configured to:
receive, by the computer system, for the first inspection vehicle at the second location: a second velocity in an x direction, a second velocity in a y direction, a second yaw angle, a second pitch angle, and a second distance from the object;

form a second comparison, by the computer system, for the first inspection vehicle at the second location: the second velocity in an x direction, the second velocity in a y direction, the second yaw angle, the second pitch angle, and the second distance from the object, to: a second reference velocity in an x direction, a second reference velocity in a y direction, a second reference yaw angle, a second reference pitch angle, and a second reference distance from the object, for the first inspection vehicle at the second location; and determine, by the computer system using the comparison, whether the second velocity in an x direction, the second velocity in a y direction, the second yaw angle, the second pitch angle, and the second distance from the object, at the second location are within a second set of tolerances and thereby valid or outside the second set of tolerances and thereby invalid.

20. The inspection system of claim 19, the controller is further configured to:

determine, by the computer system responsive the second velocity in an x direction, the second velocity in a y direction, the second yaw angle, the second pitch angle, and the second distance from the object, at the second location being invalid and prior to detecting anomalies for the object, a set of second corrective actions; and direct at least one of the first inspection vehicle or the second inspection vehicle to perform the set of second corrective actions.

21. The inspection system of claim 20, wherein the controller is configured to:

create the reference velocity in an x direction, the reference velocity in a y direction, the reference yaw angle, the reference pitch angle, and the reference distance from the object, for the first inspection vehicle at the first location based upon at least one of: a computer aided design model of the object, a point cloud scan, or historical images of the object.

22. The inspection system of claim 15, wherein the controller is further configured to:

capture, with a sensor on the first inspection vehicle, captured image data access the captured image data; access reference image data; and compare the captured image data to the reference image data to form an image comparison.

23. The inspection system of claim 15, wherein the controller is further configured to:

control generation of captured image data;

determine if captured image data is valid for analysis; and indicate that the captured image data is valid for analysis.

24. The inspection system of claim 15, wherein the controller is further configured to:

create, by the computer system, reference image data based upon at least one of: a computer aided design model of the object, a point cloud scan of the object, or historical images of the object.

25. A computer program product configured to inspect an aircraft, wherein the computer program product comprises a non-transitory computer readable storage media that comprises program instructions embodied therewith and configured for execution by a computer system to:

generate, for a first inspection vehicle, reference data based upon a relative coordinate system defined based upon an origin that is relative to a point or location on or in the aircraft, that comprises: a reference velocity in an x direction, a reference velocity in a y direction, a reference yaw angle, a reference pitch angle, and a reference distance from an object, respectively, at a first location and at a second location, wherein the first inspection vehicle comprises a sensor system;

direct transport of the first inspection vehicle to the first location and to the second location and collection of captured image data from a sensor on the first inspection vehicle;

receive, by the computer system for the first inspection vehicle at the first location, captured data that comprises: a velocity in an x direction, a velocity in a y direction, a yaw angle, a pitch angle, and a distance from the object, defined in an absolute coordinate system;

align the captured data from the absolute coordinate system into the relative coordinate system referenced to the aircraft;

form a comparison, by the computer system, for the first inspection vehicle at the first location: the velocity in an x direction, the velocity in a y direction, the yaw angle, the pitch angle, and the distance from the object, to: the reference velocity in an x direction, the reference velocity in a y direction, the reference yaw angle, the reference pitch angle, and the reference distance from the object, for the first inspection vehicle at the first location, aircraft to form the comparison;

determine, by the computer system using the comparison prior to detection of anomalies based upon the captured image data for the aircraft, whether the velocity in an x direction, the velocity in a y direction, the yaw angle, the pitch angle, and the distance from the object, at the first location are within a set of tolerances and thereby valid or outside the set of tolerances and thereby invalid;

responsive to a determination of invalidity for: the velocity in an x direction, the velocity in a y direction, the yaw angle, the pitch angle, and the distance from the object, at the first location, determine, prior to anomaly detection for the object, a set of corrective actions; and direct, prior to a detection of an anomaly on the object in a captured image, the set of corrective actions that comprise a correction to at least one of a flight path of the first inspection vehicle or a flight path of a second inspection vehicle.

\* \* \* \* \*

UNITED STATES PATENT AND TRADEMARK OFFICE
CERTIFICATE OF CORRECTION

PATENT NO. : 12,221,231 B2
APPLICATION NO. : 17/649898
DATED : February 11, 2025
INVENTOR(S) : Walter J. Jarecki et al.

Page 1 of 1

It is certified that error appears in the above-identified patent and that said Letters Patent is hereby corrected as shown below:

In the Claims

Column 32, Line 27, Claim 3, correct "in an z" to read -- in a z --,
Column 32, Line 32, Claim 3, correct "in an z" to read -- in a z --,
Column 33, Lines 46-47, Claim 11, correct "object valid" to read -- object --,
Column 34, Lines 52-53, Claim 18, delete the line break between "is" and "further",
Column 34, Line 55, Claim 18, correct "in an z" to read -- in a z --,
Column 34, Line 59, Claim 18, correct "in an z" to read -- in a z --,
Column 35, Line 20, Claim 20, correct "responsive the" to read -- responsive to the --,
Column 35, Line 41, Claim 22, correct "data" to read -- data; --,
Column 35, Line 42, Claim 22, add a line break between "data; access".

Signed and Sealed this
Eighteenth Day of March, 2025

Coke Morgan Stewart
*Acting Director of the United States Patent and Trademark Office*